United States Patent
Kiefer et al.

(10) Patent No.: US 8,140,558 B2
(45) Date of Patent: Mar. 20, 2012

(54) GENERATING STRUCTURED QUERY LANGUAGE/EXTENSIBLE MARKUP LANGUAGE (SQL/XML) STATEMENTS

(75) Inventors: Tim Kiefer, San Jose, CA (US); Matthias M. Nicola, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 382 days.

(21) Appl. No.: 12/470,751

(22) Filed: May 22, 2009

(65) Prior Publication Data

US 2010/0299327 A1 Nov. 25, 2010

(51) Int. Cl.
G06F 7/00 (2006.01)
G06F 17/30 (2006.01)

(52) U.S. Cl. ......... 707/760; 707/755; 707/763; 707/769

(58) Field of Classification Search .................. 707/760, 707/763, 755, 759, 769
See application file for complete search history.

(56) References Cited

U.S. PATENT DOCUMENTS

| 6,636,845 | B2 | 10/2003 | Chau et al. | |
| 7,099,891 | B2 | 8/2006 | Harris et al. | |
| 2008/0215542 | A1* | 9/2008 | Lim et al. | 707/3 |
| 2009/0222404 | A1* | 9/2009 | Dolin et al. | 707/2 |

FOREIGN PATENT DOCUMENTS

| JP | 2003248615 A | | 9/2003 |
| WO | WO 2004100021 A2 | * | 11/2004 |
| WO | WO 2006009768 A1 | * | 1/2006 |
| WO | WO 2007/061430 A1 | | 5/2007 |

OTHER PUBLICATIONS

Beyer, Kevin et al, "System RX: One Part Relational, One Part XML", SIGMOD 2005, Jun. 14-16, 2005, ACM, pp. 347-358.*
"Generating XML from SQL", http://publib.boulder.ibm.com/infocenter/wsphelp/index.jsp?topic=/com.ibm.etools.sqlbuilder.doc/tasks/tsqlxml.htmp, retrieved Jan. 23, 2009, 1 page.
Jigyasu, S. et al., "SQL to XQuery Translation in the AquaLogic Data Services Platform", Proceedings of the 22nd International Conference on Data Engineering, Apr. 3-7, 2006, Abstract, 1 page.
Vaswani, Vikram, "Turn SQL into XML with PHP", http://www.ibm.com/developerworks/xml/library/x-query2xml/, printed publication date Jul. 24, 2007, pp. 1-22.

* cited by examiner

*Primary Examiner* — Srirama Channavajjala
*Assistant Examiner* — Douglas McKay
(74) *Attorney, Agent, or Firm* — Francis Lammes; Stephen J. Walder, Jr; Elissa Y. Wang

(57) ABSTRACT

A mechanism is provided for generating Structured Query Language/Extensible Markup Language (SQL/XML) statements. An SQL/XML generation module receives an SQL statement that is expressed in terms of logical data items. The SQL/XML generation module parses and analyzes the SQL statement and generates a set of XMLQUERY functions, a set of XMLTABLE functions, and a set of XMLEXISTS predicates to retrieve, filter, or update at least one of XML documents or relational data based on a main mapping table and a namespace mapping table. The SQL/XML generation module generates at least one SQL/XML statement from parts of the SQL statement and the generated set of XMLQUERY functions, the set of XMLTABLE functions, and the set of XMLEXISTS predicates. The at least one SQL/XML statement is substantially equivalent in functionality to the SQL statement. The SQL/XML generation module sends the at least one SQL/XML statement to a database engine for execution.

20 Claims, 15 Drawing Sheets

FIG. 5

```
WITH pathstable (name, xmlnode, xpath) AS (
    SELECT  x.name AS name,
            x.xmlnode AS xmlnode,
            '/' || x.name AS xpath
    FROM mytable,
         XMLTABLE('$XMLDOC/*'
             COLUMNS
             name varchar(100)  PATH './local-name()',
             xmlnode XML         PATH '.') AS x
    UNION ALL
    SELECT  y.name AS name,
            y.xmlnode AS xmlnode,
            xpath|| '/' || y.name AS xpath
    FROM pathstable,
         XMLTABLE('$XMLNODE/(*,@*)'
             PASSING pathstable.xmlnode AS "XMLNODE"
             COLUMNS
             name varchar(100)  PATH 'local-name()',
             xmlnode XML         PATH '.') AS y
) SELECT name, xpath FROM pathstable;
```

| Logical Data Item Name | XPath | Node Level | Repeat Level | Leaf | SQL Type | Parent Path |
|---|---|---|---|---|---|---|
| _Order | /ns3:Order | 1 | 0 | 0 | | |
| Order_CustomerRef | /ns3:Order/ns3:CustomerRef | 2 | 0 | 1 | integer | /ns3:Order |
| Order_Oid | /ns3:Order/@Oid | 2 | 0 | 1 | integer | /ns3:Order |
| Order_Lineitem | /ns3:Order/ns3:Lineitem | 2 | 2 | 0 | | /ns3:Order |
| Lineitem_Price | /ns3:Order/ns3:Lineitem/ns3:Price | 3 | 0 | 1 | double | /ns3:Order/ns3:Lineitem |
| Lineitem_Qty | /ns3:Order/ns3:Lineitem/ns3:Qty | 4 | 0 | 1 | integer | /ns3:Order/ns3:Lineitem |
| Lineitem_Product | /ns3:Order/ns3:Lineitem/ns3:Product | 5 | 0 | 1 | varchar(50) | /ns3:Order/ns3:Lineitem |

*FIG. 6*

```
WITH mapping (element, xpath, parentpath,
              leaf, type, repeat) AS (
    SELECT element, xpath, parentpath,
           leaf, type, repeat
    FROM intermediate
    WHERE level = 1
    UNION ALL
    SELECT    intermediate.element,
              intermediate.xpath,
              intermediate.parentpath,
              intermediate.leaf,
              intermediate.type,
              MAX(intermediate.repeat,
                  mapping.repeat) AS repeat
    FROM mapping, intermediate
    WHERE   intermediate.parentpath =
            mapping.xpath
) SELECT * FROM mapping WHERE leaf = 1;
```
— 602

| Logical Data Item Name | Table | Column | Xpaths | Repeat Level | SQL Data Type |
|---|---|---|---|---|---|
| name | customer | CDOC | /ns1:Customer/ns1:Name | 0 | varchar(30) |
| country | customer | CDOC | /ns1:Customer/ns2:Addr/@Country | 0 | varchar(30) |
| phone | customer | CDOC | /ns1:Customer/ns1:Phone | 2 | varchar(12) |
| email | customer | CDOC | /ns1:Customer/ns1:Email | 2 | varchar(30) |
| status | customer | CDOC | /ns1:Customer/@Status | 0 | integer |
| status | customer | CDOC | /ns1:Customer/ns1:Status | 0 | integer |
| customerID | customer | cid | SQL | | |
| orderID | order | ODOC | /ns3:Order/@Oid | 0 | integer |
| customer Ref | order | ODOC | /ns3:Order/ns3:CustomerRef | 0 | integer |
| product | order | ODOC | /ns3:Order/ns3:Lineitem/ns3:Product | 2 | varchar(50) |
| product | order | ODOC | /ns3:Order/ns3:Product | 2 | varchar(50) |
| qty | order | ODOC | /ns3:Order/ns3:Lineitem/ns3:Qty | 2 | double |
| qty | order | ODOC | /ns3:Order/ns3:Product/@Qty | 2 | double |
| price | order | ODOC | /ns3:Order/ns3:Lineitem/ns3:Price | 2 | double |
| price | order | ODOC | /ns3:Order/ns3:Product/@Price | 2 | double |

```
SELECT customerID, name,
       country, status
FROM customer
WHERE name = 'John Smith'
```

~702

```
SELECT cid as customerID, name, country, status
FROM customer,
     XMLTABLE(XMLNAMESPACES('http://mycompany.org/customer' AS "ns1",
                            'http://mycompany.org/address' AS "ns2"),
         '$CDOC/ns1:Customer'
         COLUMNS
           name     varchar(30)  PATH 'ns1:Name',
           country  varchar(30)  PATH 'ns2:Addr/@Country',
           status   integer      PATH '(@Status, ns1:Status)'
     ) AS customerXML
WHERE XMLEXISTS('declare namespace ns1="http://mycompany.org/customer";
                 $CDOC/ns1:Customer/ns1:Name[. = "John Smith"]')
```

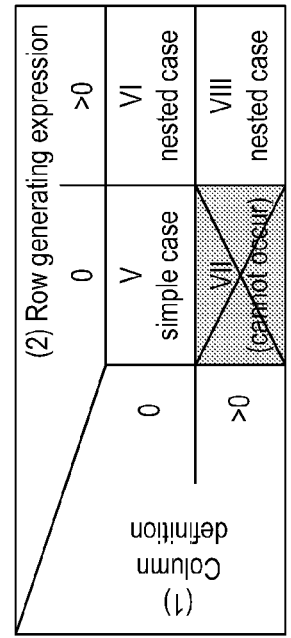

*FIG. 9*

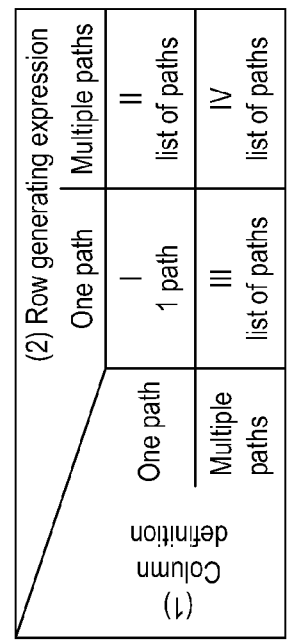

*FIG. 8*

1002
```
UPDATE customer
SET name = 'Peter Smith', status = 3
WHERE customerID = 27;
```

1004
```
UPDATE customer
SET cdoc = XMLQUERY('
   declare namespace ns1="http://../customer";
     copy $new := $CDOC
   modify (
      for $i in $new/ns1:Customer/ns1:Name return
        do replace value of $i with "Peter Smith",
      for $i in $new/(ns1:Customer/@Status,
                      ns1:Customer/ns1:Status) return
        do replace value of $i with "3")
   return $new')
WHERE cid = 27;
```

*FIG. 10*

1102
```
UPDATE order
SET price = 199

1104
WHERE
   product = 'Printer'
```

```
UPDATE order
SET odoc = XMLQUERY('declare namespace ns3="http://mycompany.org/order";
          copy $new := $ODOC
          modify for $i in
            ($new/ns3:Order/ns3:Lineitem/o:Price[../ns3:Product = "Printer"],
             $new/ns3:Order/ns3:Product/@Price[.. = "Printer"]) return
               do replace value of $i with "199"
          return $new')
WHERE XMLEXISTS('declare namespace ns3="http://mycompany.org/order"
              ; $ODOC/ns3:Order[ns3:Lineitem/ns3:Product[. = ("Printer")] or
     1106                       ns3:Product[. = ("Printer")]]')
```
1108

*FIG. 11*

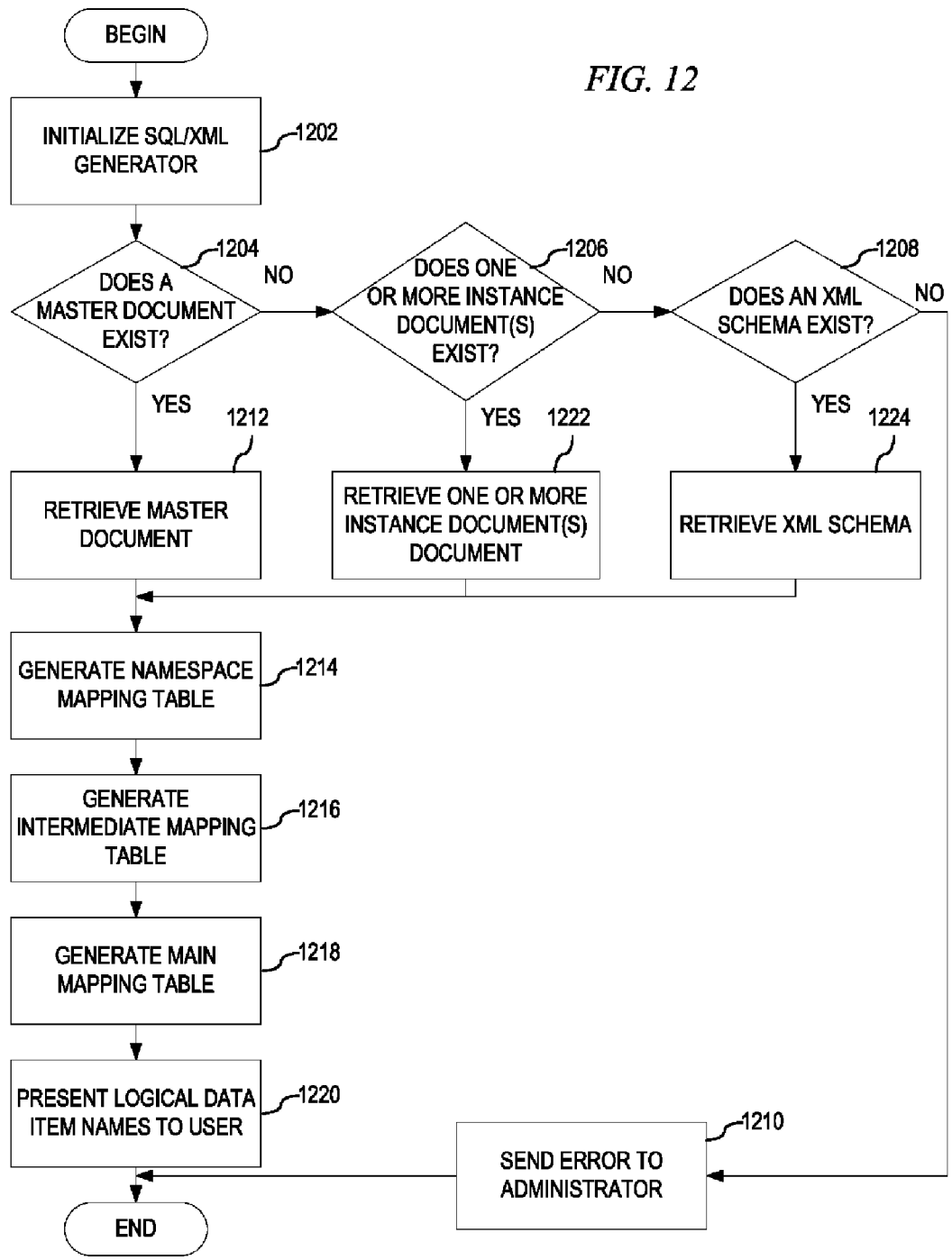

GENERATING STRUCTURED QUERY LANGUAGE/EXTENSIBLE MARKUP LANGUAGE (SQL/XML) STATEMENTS

BACKGROUND

The present application relates generally to an improved data processing apparatus and method and more specifically to an apparatus and method for generating Structured Query Language/Extensible Markup Language (SQL/XML) statements.

The development of the relational data model together with well-defined concepts for data normalization, relational algebra, and query optimization, has laid the foundation for the extensive commercial success of relational databases. A corner stone of that success is the Structured Query Language (SQL). Today, commercial applications in practically every industry rely heavily on SQL and relational databases. For many companies, these applications include business critical systems and constitute a tremendous investment. Thus, today's database professionals, such as database administrators and database application developers, typically have a skill set that is heavily geared towards relational databases and SQL.

In recent years Extensible Markup Language (XML) has continued to emerge as the de-facto standard for data exchange. The main reasons for the emergence include that XML is extensible, flexible, and self-describing while remaining vendor and platform independent. The XML data model is suited for any combination of structured, unstructured, and semi-structured data. Also, XML documents may be queried, transformed, and validated through widely available tools and standards such as XML parsers, XQuery, XSLT, and XML Schema. Many enterprises also store large amounts of business data permanently as XML. Reasons include auditing requirements, regulatory compliance, or the fact that XML can sometimes be a more suitable data model than a relational schema. For example, data that have a high degree of variability and whose structure may evolve over time are often easier to handle in XML than in relational format. The easier handling is because a relational database schema has a very fixed rigorous definition while XML provides more flexibility.

In response to these needs, the major relational database vendors have added XML capabilities to their products. Additionally, the SQL standard has been extended to include an XML data type as well as XML-specific functions and predicates. This is called SQL/XML. The functions XMLQUERY and XMLTABLE as well as the predicate XMLEXISTS allow users to include XPath or XQuery expressions in their SQL statements. The functions and predicate enable applications to query or update XML and relational data in an integrated manner. This is necessary because most companies do not manage XML data separately from their relational data. Instead, a hybrid database design is commonly used where tables contain a mix of XML and relational columns.

The adoption of SQL/XML faces several challenges. Many relational legacy applications, based on SQL, require access to the increasing amount of XML data. However, converting legacy applications from SQL to SQL/XML is often too expensive, time consuming, or risky. Another challenge is to actually formulate queries and updates against XML data. XQuery and SQL/XML are relatively new compared to SQL and the use of XQuery and SQL/XML poses a number of problems:

Users need to learn these new languages which are often perceived as difficult to master. The difficulty stems from the differences between the XML data model and the relational data model.

XQuery and SQL/XML involve path expressions which navigate the tree structure of XML documents. To formulate path expressions, users need detailed knowledge about the structure of the XML data. Knowing which data items exist may not be enough. That is, knowing the exact case-sensitive name, namespace, and location of the data items within the hierarchical document structure may also be necessary. However, the hierarchical document structure is often complex, difficult to understand, or even unknown to the user.

As more XML documents are accumulated in a database, newer documents may have a different XML Schema than older ones. This requires queries and updates to work across documents for different schemas and compounds the complexity of writing SQL/XML statements. Also, existing XML queries may need to be changed because existing XML queries might return incorrect or incomplete results when the XML Schema evolves.

In a hybrid database, where some data is stored in relational format and some in XML format, users need to know which data is in which format before the users may write correct queries.

These issues make writing correct SQL/XML statements often difficult, sometimes even impossible, for users.

SUMMARY

In one illustrative embodiment, a method, in a data processing system, is provided for generating Structured Query Language/Extensible Markup Language (SQL/XML) statements. The illustrative embodiment receives an SQL statement, wherein the SQL statement is expressed in terms of logical data items that are exposed by exposing a set of mapping tables that list names of the logical data items together with information about the logical data items. The illustrative embodiment parses and analyzes the SQL statement. The illustrative embodiment generates, based on a main mapping table and a namespace mapping table, a set of XMLQUERY functions, a set of XMLTABLE functions, and a set of XMLEXISTS predicates to retrieve, filter, or update at least one of XML documents or relational data. The illustrative embodiment generates at least one SQL/XML statement from parts of the SQL statement and the generated set of XMLQUERY functions, the set of XMLTABLE functions, and the set of XMLEXISTS predicates. In the illustrative embodiment, the SQL/XML statement is substantially equivalent in functionality to the SQL statement. The illustrative embodiment sends the at least one SQL/XML statement to a database engine for execution.

In other illustrative embodiments, a computer program product comprising a computer usable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 5 depicts an exemplary pseudo code that populates an intermediate mapping table that can be used to generate a main mapping table in accordance with an illustrative embodiment;

FIG. 6 depicts an exemplary pseudo code that populates a main mapping table in accordance with an illustrative embodiment;

FIG. 7 depicts an example of generating an SQL/XML statement from a user submitted SQL query in accordance with an illustrative embodiment;

FIG. 8 depicts possible combinations for whether the logical item is mapped to one or multiple paths in the mapping table in accordance with an illustrative embodiment;

FIG. 9 depicts possible combinations for whether the items occur once or multiple times per document in accordance with an illustrative embodiment;

FIG. 10 depicts an exemplary SQL update statement and a corresponding exemplary SQL/XML update statement in accordance with an illustrative embodiment;

FIG. 11 shows an example where a logical data item is updated in accordance with an illustrative embodiment;

FIG. 12 depicts an exemplary flow diagram of the operation performed by the mapping generation module of the Structured Query Language/Extensible Markup Language (SQL/XML) generator in accordance with an illustrative embodiment;

DETAILED DESCRIPTION

Figure 1:
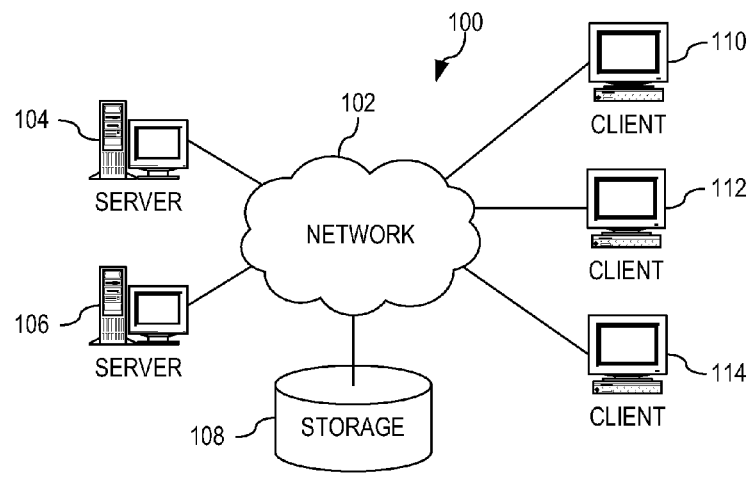
FIG. 1 depicts a pictorial representation of an example distributed data processing system in which aspects of the illustrative embodiments may be implemented.

The illustrative embodiments provide a mechanism for generating Structured Query Language/Extensible Markup Language (SQL/XML) statements automatically. The mechanism of the illustrative embodiments works for SQL/XML queries and for SQL/XML updates. In the case of SQL/XML updates, XQuery transform expressions are generated and included in SQL update statements. The input to the mechanism of the illustrative embodiments may be a simple representation of a user query or update. For example, the input may come from a GUI or web interface where the user is presented with logical data items which, in case of a query, may be selected for projection and used to filter, group, or order the result, or, in case of an update, may be selected with subsequent modification of their values. Alternatively, the input may be a regular SQL query or update statement that uses logical data item names as column names in the select, where, group by, and order by clauses, as well as in the set clause in case of an update statement. Translating from SQL to SQL/XML may use a mapping from logical data item names to their actual physical locations, where these actual locations are described either by a relational column name or an XML column name with an XPath expression, all required namespaces, and other metadata. The illustrative embodiments may also use a semi-automatic method to generate such mapping information and to store the information in a mapping table.

The mapping table provides benefits beyond the query translation. First, the mapping table serves as a metadata repository for all XML and relational data in the database. While relational columns are documented in the system tables of the database, XML columns are often a black box for the end user. The mapping table contains information about all XML attributes and elements that carry business data and are candidates for being queried. Even if an XML Schema exists, the XML Schema may consist of many schema documents and the XML Schema notation may be too complex to serve as metadata for users who need to write queries and updates. Second, the mapping helps users and applications deal with schema evolution. If XML data for a new (version of a) XML Schema is added to the database, the mapping table can be updated or regenerated. SQL query and update statements can typically remain unchanged. Instead, the translation algorithm uses the updated mapping table to generate new SQL/XML statements that take the new schema information into account. The mapping table may be the single point of maintenance for schema evolution and relieves the user from manually modifying all existing queries across all applications that use the database.

While the following generation of the mapping tables and query and update translations are described using SQL/XML support in DB2 with the query translation running either as a Java library in an application or as a Java stored procedure in DB2 and the stored procedure accepting an SQL statement as parameter, generating and executing an SQL/XML statement, and returning the desired result set, the illustrative embodiments are not limited to such. That is, the illustrative embodiments recognize other implementations to generate mapping tables and query translations without departing from the spirit and scope of the invention.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer-usable, computer-readable, or computer-recordable medium(s) may be utilized. The computer-usable, computer-readable, or computer-recordable medium may be, for example, but not limited to, an electronic, magnetic, optical, electromagnetic, infrared, or semiconductor system, apparatus, device, or propagation medium. More specific examples (a non-exhaustive list) of the computer-usable, computer-readable, or computer-recordable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable, computer-readable, or computer-recordable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable, computer-readable, or computer-recordable medium may be any medium that can contain, store, communicate, propagate, or transport the program for use by or in connection with the instruction execution system, apparatus, or device. The computer-usable, computer-readable, or computer-recordable medium may include a propagated data signal with the computer-usable program code embodied therewith, either in baseband or as part of a carrier wave. Thus, signal on a carrier wave is a reasonable equivalent to the claimed "computer recordable medium having a computer readable program recorded thereon." The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In addition, the program code may be embodied on a computer readable storage medium on the server or the remote computer and downloaded over a network to a computer readable storage medium of the remote computer or the users' computer for storage and/or execution. Moreover, any of the computing systems or data processing systems may store the program code in a computer readable storage medium after having downloaded the program code over a network from a remote computing system or data processing system.

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The illustrative embodiments generate queries and updates for Extensible Markup Language (XML) data automatically. Users express their queries or updates either in a graphical user interface (GUI) or in a simple notation they are very familiar with, such as Structured Query Language (SQL). Users are provided with a list of logical data item names that the users may query or update. Providing a list of logical data item names and automatically generating SQL/XML query or update statements relieves the users from:

(1) Knowing or learning the XQuery or SQL/XML languages;
(2) Analyzing and understanding the hierarchical structure of the XML data;
(3) Writing XPath or XQuery Update expressions according to the exact structure of the XML data;
(4) Manually modifying queries when the XML schema evolves; and/or
(5) Knowing which data is stored in relational format and which data is in XML format.

The illustrative embodiments provide a mapping table that maps logical data items to their physical locations in XML data or relational columns. The logical data item names are exposed to the users. The physical locations include path expressions as well as namespace and data type information. The mapping table may be populated automatically by exploring:

a representative subset of the XML data,
an XML Schema that defines the XML data, or
a "master document" that is derived from an XML Schema.

Additionally, the mapping table may further be refined by an administrator, if needed.

The illustrative embodiments allow a user to write a query or update statement in regular SQL notation based on logical data item names. The illustrative mechanisms then analyze such a query or update statement and use the mapping table to look up the physical information for each logical data item used in the user's SQL statement. With this information, the illustrative embodiments generate a query or update statement in SQL/XML notation, with path expressions, namespaces, etc., which, in case of a query, returns the required data values from the XML documents as a result for the user's query, or, in case of an update, modifies values in the XML documents according to the user's SQL update statement. The required data that is queried or updated may also be in a mix of relational and XML columns in the database.

If the XML data evolves, such as documents with a somewhat different structure are added to the database, the mapping table may be updated or regenerated automatically to reflect the physical changes in the data. The users' queries and updates, which only reference logical data items, do not need to be changed. Based on the updated mapping table they will be translated into SQL/XML statements that account for the schema evolution. Schema evolution may include changes such that a logical data item has a different physical name, has a different physical location in the XML structure, occurs in multiple distinct locations, or other changes.

Figure 2:
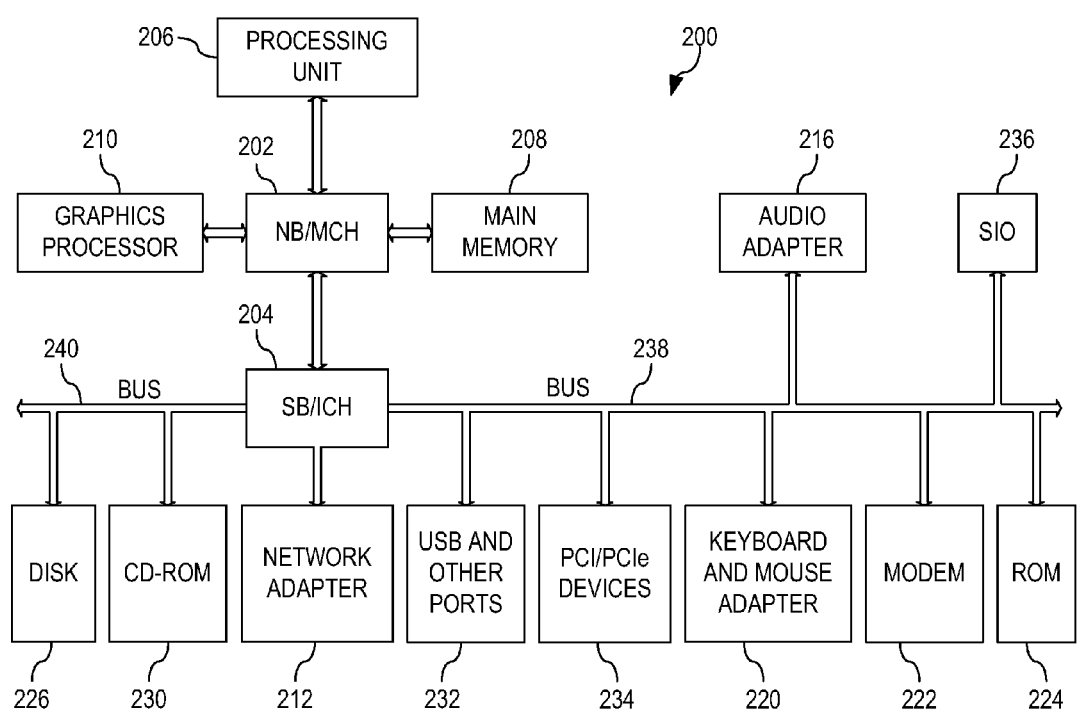
FIG. 2 shows a block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation for generating SQL/XML statements automatically this is only an example and is not intended to state or imply any limitation with regard to the features of the present invention. To the contrary, the illustrative embodiments are intended to include distributed data processing environments and embodiments in which SQL/XML statements may be generated automatically.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like.

As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USH) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

The illustrative embodiments provide a mechanism for generating Structured Query Language/Extensible Markup Language (SQL/XML) statements automatically. The mechanism of the illustrative embodiments works for SQL/XML queries and for SQL/XML updates. The input to the mechanism of the illustrative embodiments may be a simple representation of a user query or update. For example, the input may be a regular SQL statement that uses logical data item names as column names in the select, where, group by, and order by clauses, as well as in the set clause in the case of updates. The SQL statement may be translated to SQL/XML using a mapping from logical data item names to their physical locations, such as a relational column name or an XML column name with an XPath expression, all required namespaces, and other metadata. For SQL/XML updates, XQuery transform expressions are generated and included in SQL update statements.

Figure 3:
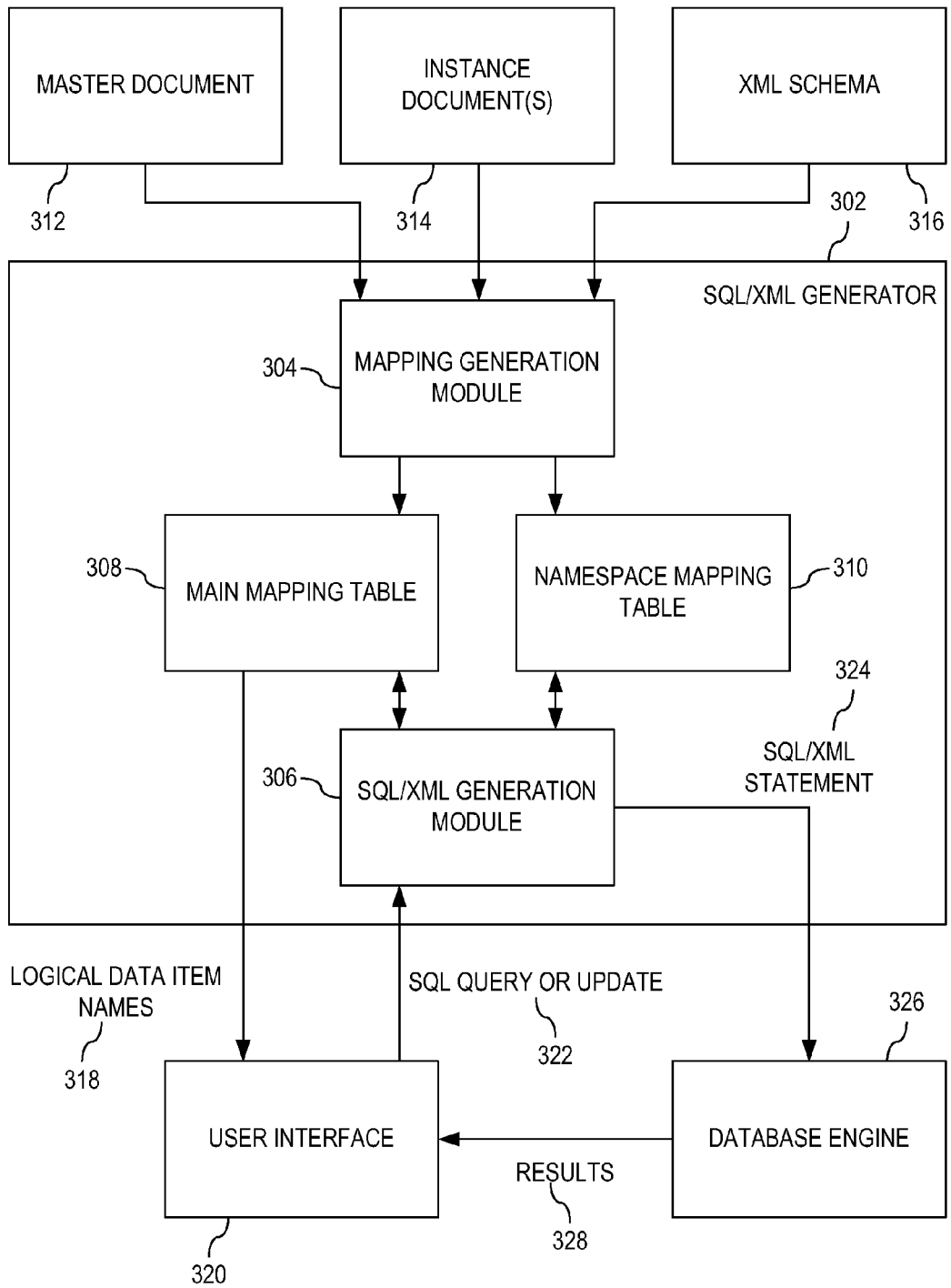
FIG. 3 depicts an exemplary functional block diagram of a mechanism for Structured Query Language/Extensible Markup Language (SQL/XML) query generation in accordance with an illustrative embodiment.

FIG. 3 depicts an exemplary functional block diagram of a mechanism for Structured Query Language/Extensible Markup Language (SQL/XML) query generation in accordance with an illustrative embodiment. SQL/XML generator 302 may comprise mapping generation module 304 and SQL/XML generation module 306. In the illustrative embodiment, mapping generation module 304 generates two tables, main mapping table 308 and namespace mapping table 310, for use by a user of SQL/XML generator 302. However, mapping generation module 304 generating tables is just one possible way to organize and represent and store the mapping information. That is, a table structure is an intuitive and efficient representation, but the illustrative embodiments are not limited to only generating tables to organize and represent and store the mapping information. One of ordinary skill in the art would recognize that other representations or data structures may be used in the illustrative embodiments, such as an in-memory hash-map, a linked list, a variable of type ARRAY in a programming language, a comma-separated flat file, or the like, without departing from the spirit and scope of the invention. For real-world XML applications a main mapping table may contain thousands of entries. For example, industry-specific XML schemas such as FpML, FIXML, OAGIS, HL7, STAR, and UNIFI typically define thousands of optional XML elements and attributes.

Mapping generation module 304 generates main mapping table 308 and namespace mapping table 310 semi-automatically based on master document 312, instance documents 314, XML schema 316, or a combination of two or more of master document 312, instance documents 314, and XML schema 316. Existing XML tools, such as Stylus Studio®'s Extensible Markup Language (XML) Integrated Development Environment (IDE), generate master document 312 from an XML schema. Master document 312 includes all mandatory and optional elements and attributes on all possible paths. Master document 312 includes elements for all the alternatives defined by constructs, such as xs:choice or the like. However, master document 312 may not necessarily be valid according to the XML schema from which master document 312 was generated, because, while master document 312 may not be valid, master document 312 shows all possible options that can occur and ensures that the generated mapping tables are correct.

If master document 312 does not exist, mapping generation module 304 may use instance documents 314 or XML schema 316 to generate main mapping table 308 and namespace mapping table 310. Instance documents 314 may contain disjunct sets of paths, namespaces, elements, and/or attributes. Mapping generation module 304 may fill main mapping table 308 and namespace mapping table 310 with information about all distinct paths and nodes across all of instance documents 314. In order for mapping generation module 304 to populate both main mapping table 308 and namespace mapping table 310 from master document 312, instance documents 314, and/or XML schema 316, mapping generation module 304 may implement one or more exemplary SQL/XML statements. Although, only one SQL/XML statement is depicted to populate namespace mapping table 310 and only one SQL/XML statement is depicted to populate main mapping table 308, the illustrative embodiment recognize other SQL/XML statements or even custom code (e.g. in Java™) may be used to populate main mapping table 308 and namespace mapping table 310 without departing from the spirit and scope of the invention.

Figure 4:
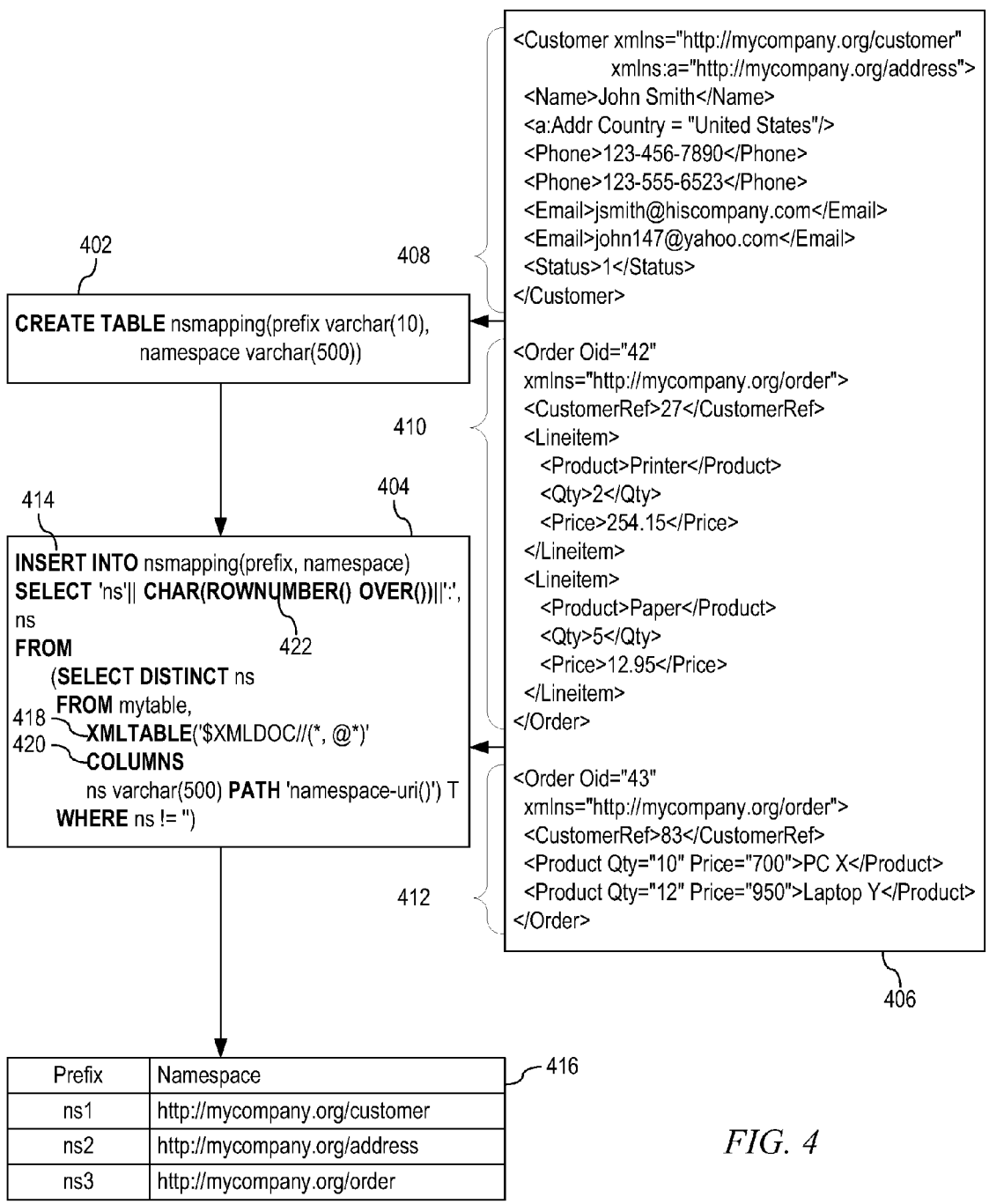
FIG. 4 depicts an exemplary pseudo code that populates a namespace mapping table in accordance with an illustrative embodiment.

FIG. 4 depicts an exemplary pseudo code that populates namespace mapping table 310 in accordance with an illustrative embodiment. Mapping generation module 304 executes pseudo code 402 to generate an exemplary namespace mapping table and executes pseudo code 404 to extract all distinct namespace Uniform Resource Identifier (URIs) from a master document, each of a set of instance documents, or an XML schema. For example, exemplary documents 406 illustrates one exemplary customer document 408 and two exemplary order documents 410 and 412. Order documents 410 and 412 may be the same or have different XML structures, as is shown in the example. A reason for different structures in the order document can be, among many others, that the orders arrive from different order entry systems. In pseudo code 404, SQL/XML insert statement 414 extracts all distinct namespace URIs from customer document 408 and order documents 410 and 412 in the XML column XMLDOC of table mytable, and inserts them with unique prefixes into table nsmapping 416. In the XMLTABLE function 418, the row generating expression $XMLDOC//(*, @*) produces one row per element or attribute in the document, and column definition 420 uses the XQuery function namespace-uri( ) to obtain each element's or attribute's namespace. The OLAP function rownumber( ) 422 is used to generate a unique prefix for each distinct namespace URI in customer document 408 and order documents 410 and 412.

FIG. 5 depicts an exemplary pseudo code that populates an intermediate mapping table that can be used to generate main mapping table 308 of FIG. 3 in accordance with an illustrative embodiment. Mapping generation module 304 executes pseudo code 502 to populate intermediate mapping table 504 using a recursive SQL/XML statement, which traverses master document 312, instance documents 314, and/or XML schema 316. On each level of the document, the SQL/XML statement collects meta-information about each node and recursively passes the metadata to the next level. This produces all existing paths from the document root to the leaves. Pseudo code 502 illustrates a reduced skeleton of an actual statement. The statement utilizes a common table expression to achieve the recursive tree traversal.

SELECT block 506 retrieves a document's root node (xml-node), together with its name and path (xpath 516) and populates those fields in intermediate mapping table 504. SELECT block 508, i.e. the second leg of UNION ALL 510, takes the already existing rows in the view pathstable as input.

SELECT block 506 adds the input document's root element to pathstable. SELECT block 508 adds all child nodes in a similar manner. Mapping generation module 304 executing pseudo code 502 populates xpaths 516 in intermediate mapping table 504 by executing SELECT blocks 506 and 508. Xpaths 516 generated by SELECT block 508 are composed of the parent's xpath and the node's local name. SELECT block 508 then processes all newly added parent XML nodes, until no new child nodes are found.

However, mapping generation module 304 executing pseudo code 502 may not provide all necessary information to populate all element mapping. Additional metadata collection may be added to this skeleton, as described in the following. For example, mapping generation module 304 may execute additional pseudo code to computer and populate parent path 524 of the node, if any. Mapping generation module 304 may execute additional pseudo code to populate node's level 512 in intermediate mapping table 504. Node's level 512 represents the node level in the tree that is initialized with 1 for the root and incremented for each level of the recursion. Mapping generation module 304 may execute exemplary XQuery expression "if (./*) then (0) else (1)" to indicate whether or not an element is a leaf element in order to populate leaf 514 in intermediate mapping table 504. Alternatively, the exemplary XQuery expression "if (./text( )) then (1) else (0)" may be used if mixed content elements should be included. The generated xpaths 516 also need to contain an "@" sign for any attribute. Mapping generation module 304 may execute exemplary XQuery expression "if (./self::attribute( )) then ("@") else (" ")" to add an "@" sign to xpath 516 in intermediate mapping table 504 for any attribute. For each encountered node, the function "namespace-uri( )" obtains its namespace URI, which is used to lookup the corresponding unique prefix from the namespace mapping table 310.

To determine a suitable SQL type 518 that an element or attribute value may be cast to, mapping generation module 304 may execute exemplary XQuery expression "castable" to test whether a node's value can be cast to "xs:integer, xs:date, xs:double", and so on. For example, if a node can be cast to "xs:integer", mapping generation module 304 may assign the SQL data type integer, and similarly for other data types to SQL type 518 in intermediate mapping table 504. To determine whether a node repeats multiple times per document, mapping generation module 304 may execute an exemplary group by clause to aggregate and count nodes that have the same name and parent within the same document which is indicated in repeat level 520 in intermediate mapping table 504. Also, mapping generation module 304 may populate logical data item name 522 in intermediate mapping table 504 for each element or attribute by appending its name to its parent's name. Another group by clause aggregates identical elements or attributes that may have occurred in multiple documents. All of the above features may be added to pseudo code 502 to produce the information in the intermediate mapping table 504.

Thus, intermediate mapping table 504 illustrates all of the entries of an intermediate table from an order document 410 in FIG. 4. Intermediate mapping table 504 contains leaf and non-leaf nodes, but the latter can be removed for application scenarios in which all business data of interest is in the leaves. However, the invention works equally well with and without leaf nodes. Note also that the elements Price, Qty and Product occur multiple times per document but their repeat level is still 0. These elements do not repeat within their parents, but the parent node "Lineitem" itself repeats. This information may be pushed down the tree to be available for all leaf nodes, as described next.

FIG. 6 depicts an exemplary pseudo code that populates a main mapping table in accordance with an illustrative embodiment, based on the intermediate mapping whose generation was illustrated in FIG. 5. Mapping generation module 304 in FIG. 3 executes pseudo code 602 to produce mapping information 604 and assigns each element and attribute its correct repeat level 614, which is either its parent's repeat level or its own repeat level, whichever is higher. Mapping generation module 304 also executes pseudo code 602 to exclude non-leaf elements from main mapping table 308, such as lineitem, and lists only leaf elements, i.e. ones that only contain text nodes with the actual business data. This choice is not required for this invention but it is useful for data centric XML applications that typically query the values of leaf-elements, such as Qty and Price, rather than the values of non-leaf elements which are defined as the concatenation as all text nodes in the sub-tree.

If elements or attributes with the same name occur on multiple different paths, then mapping generation module 304 executes pseudo code 602 to map these paths to the different logical data item names 606. An administrator with domain knowledge about the data may subsequently adjust the mapping and use the same logical name for multiple paths if they represent the same logical data item. For example, in mapping table 604, the logical data item names 606 status, product, qty, and price each have more than one path associated with them. For example, in some XML documents the price information may be located at /ns3:Order/ns3:Lineitem/ns3:Price and in other documents at /ns3:Order/ns3:Product/@Price. These two paths are different but lead to the same logical information in documents of different structure. Hence, an administrator may edit logical data item names 606 in mapping table 604 to assign the same logical name (price) to these two paths. The administrator may also edit any logical data item names 606 to make them more intuitive to the end user than the automatically generated names 522 in the intermediate mapping table 504. For example, the administrator may choose to rename the generated logical data item name 522 "Lineitem_Price" to "price" in mapping table 604. The administrator may further decide to adjust the SQL Data Type 616.

Execution of pseudo code 602 results in:

Population of column name 608 and corresponding table name 610. Pseudo code 602 only produces information about data items that map to XML columns. Mapping information for non-XML columns may trivially be taken from the existing data catalog of the database. Mapping information for non-XML columns are identified by the keyword "SQL" in column 612. Hence, all rows in the mapping table where column 612 shows a path (and not "SQL") refer to XML columns. Thus, if column name 608 is of type XML, then the mapping may also include:

One or more XPaths 612 that point to the location of the element or attribute in the XML data. XPaths 612 may also include namespace prefixes as needed.

Repeat level 614, i.e. the deepest level in an XPath at which an element can occur more than once. The repeat level is 0 if the path occurs at most once per document. For the xpath/ns3:Order/ns3:Lineitem/ns3:Qty the repeat level is 2 because the repeating element is Lineitem and not Qty. Repeat level information is needed to properly choose the row-generating expression for XMLTABLE functions.

SQL data type 616 that the XML element or attribute may be cast to. An SQL data type is required for XMLTABLE functions.

Thus, main mapping table 604 illustrates all of the entries of an intermediate table from both order document 410 in FIG. 4 populated to intermediate mapping table 504 of FIG. 5 and customer document 408 in FIG. 4 but not shown in FIG. 5.

Returning to FIG. 3, mapping generation module 304 separates namespace mapping table 310, such as namespace mapping table 416 of FIG. 4, from main mapping table 308, such as main mapping table 604 of FIG. 6, in order to allow for handling XML data where multiple different namespaces occur in a single path.

Mapping generation module 304 distinguishes between two orthogonal notions of (a) multiple paths per logical data item and (b) multiple occurrences of a given path. That is, a logical data item may be mapped either to the same path in all documents, or to multiple different paths. For example, a customer's status information may be an element in one instance document and an attribute in another. The logical data item status is therefore said to have multiple associated paths. However, the illustrative embodiments do not allow for different paths for the same logical data item in the same instance document. If two elements with the same name appear on different paths in the same document then the elements usually have a logically distinct meaning, despite having identical names. Separately, any XML element or attribute on any path may occur multiple times in the same document.

Once mapping generation module 304 generates namespace mapping table 310 and main mapping table 308, SQL/XML generator 302 presents a list of logical data item names 318 from main mapping table 308 to a user. This presentation may be via use interface 320 or via other means, such as traditional database catalog or metadata tables. A user may then build a simple SQL query or update statement using one or more of the logical data item names 318 and submit SQL query or update 322 to SQL/XML generation module 306. SQL/XML generation module 306 automatically generates an SQL/XML statement front the submitted SQL query or update 322, which references logical data item names listed in main mapping to 308. In order to generate the SQL/XML statement 324, SQL/XML generation module 305 parses and analyzes SQL query or update 322, builds XMLQUERY functions, XMLTABLE functions and XMLEXISTS predicates to retrieve, filter, or update XML elements and attributes as needed, and then generates SQL/XML statement 324 from parts of SQL query or update. 322 and the generated XMLQUERY, XMLTABLE functions, and XMLEXISTS predicates. The SQL/XML statement is substantially equivalent in functionality to the SQL statement, Generated SQL/XML query statements contain XMLTABLE functions in their from clause and may contain XMLEXISTS predicates in their where clause. Generated SQL/XML update statements use XMLQUERY functions in their set clause and may contain XMLEXISTS predicates in their where clause.

When query generation module 306 parses SQL query or update 322, SQL/XML generation module 306 builds SQL/XML functions by separating relevant SQL clauses from one another, including clauses such as select, from, where, group-by, and order-by clauses in SQL queries or update and set clauses in SQL updates. SQL/XML generation module 306 divides all logical data items referenced in the select, group-by, and order-by clauses into two groups, i.e. those that map to relational columns and those that map to XML columns. SQL/XML generation module 306 replaces the logical data items that reference relational columns by the actual physical column names listed in main mapping table 308. SQL/XML generation module 306 assigns physical column names in any select clauses their logical name as an alias. SQL/XML generation module 306 groups all logical data items that refer to XML elements or attributes by the corresponding XML columns. SQL/XML generation module 306 uses the logical items that map to the same XML column to produce one XMLTABLE function per XML column, where each logical item is represented by one column definition. In this way, SQL/XML generation module 306 assigns a set of logical data items to each XMLTABLE function. This includes, for example, logical data items referenced in the order-by or group-by clauses of the SQL query, even if they are not listed in the select clause.

FIG. 7 depicts an example of generating an SQL/XML statement from a user submitted SQL query in accordance with an illustrative embodiment. In FIG. 7, a user submits SQL query 702 that returns the ID, name, country and status for the customer named John Smith. SQL query 702 consists of a select clause ("select customerID, name, country, status"), a from clause ("from customer"), and a where clause ("where name='John Smith'"). The logical data item customerID references a relational column and SQL/XML generation module 306 replaces logical data item customerID with the physical column name cid. The other logical data items reference XML elements or attributes. Since the XML elements or attributes are all located in the XML column cdoc, SQL/XML generation module 306 assigns the XML elements or attributes to one XMLTABLE function.

If the select clause contains column functions, then SQL/XML generation module 306 parses the column functions to extract all referenced logical data items. For the generated SQL/XML query 704, SQL/XML generation module 306 augments the original from clause with the generated XMLTABLE functions.

In the where clause, SQL/XML generation module 306 moves all predicates on logical data items that reference relational columns to the generated query unchanged. SQL/XML generation module 306 translates predicates that involve at least one logical data item that maps to an XML column to XMLEXISTS predicates. For example, the SQL predicate name='John Smith' uses the logical data item name which maps to an XML element. SQL/XML generation module 306 converts the SQL predicate into a corresponding XMLEXISTS predicate. If a logical data item that maps to an XML element or attribute is used in multiple predicates, then those are combined in a single XMLEXISTS predicate.

Once SQL/XML generation module 306 determines the number of required XMLTABLE functions (one per XML column that contains referenced XML elements or attributes) and assigns a set of logical data items to each, SQL/XML generation module 306 builds each XMLTABLE function in three steps. In the first step SQL/XML generation module 306 performs a lookup in main mapping table 308 and namespace mapping table 310 for all logical data items that have been assigned to the XMLTABLE function. Namespaces that occur in any of the corresponding path expressions are combined in an XMLNAMESPACES function, which is added to the XMLTABLE function.

In the second step, SQL/XML generation module 306 builds a row-generating expression, which defines the context for all column definitions. An XMLTABLE function always returns one row for each node found on the row-generating path, i.e. either one or multiple rows per input document. Therefore, the XMLTABLE function may differentiate between two cases, which can be called "simple case" and "nested case". The simple case occurs if each XML element or attribute returned by the XMLTABLE function occurs at most once per document. Hence, in the simple case each XML document contributes at most one row to the result set. If the XMLTABLE function encounters the simple case, then the XMLTABLE function obtains a corresponding path from main mapping table 308 for each logical data item that was previously assigned to the XMLTABLE function. In the simple case, SQL/XML generation module 306 chooses the longest common prefix of these paths as the row generating expression, which is also the context for all relative paths in the COLUMNS clause.

SQL/XML query 704 illustrates determining a row-generating expression in a simple case. SQL query 702 uses the logical data items customerID, name, country, and status. Because customerID refers to a relational column, customerID is not assigned to the XMLTABLE function. However, the three other data items (i.e., name, country, and status) occur at most once per document, thus a simple case applies. Using main mapping table 308, SQL/XML generation module 306 determines paths for these logical items as:

$CDOC/ns1:Customer/ns1:Name
$CDOC/ns1:Customer/ns2:Addr/@Country
$CDOC/ns1:Customer/@Status
$CDOC/ns1:Customer/ns1:Status SQL/XML generation module 306 determines that the logical data item "status" occurs in two different paths, thus, both paths are included in the set of paths. Additionally, SQL/XML generation module 306 determines that the longest common prefix is $CDOC/ns1:Customer and, thus, uses $CDOC/ns1:Customer as the row-generating expression in the XMLTABLE function.

A nested case occurs if SQL/XML generation module 306 determines that at least one logical data item is assigned to the XMLTABLE function that can occur multiple times per document. In this case, the row-generating expression generates multiple rows per input document. SQL/XML generation module 306 identifies such repeating items in main mapping table 308 by a repeat level greater than 0. The paths of all repeating items that are assigned to the XMLTABLE function are candidates for the row-generating expression. From the candidates for the row-generating expression, SQL/XML generation module 306 selects one with the greatest repeat level and if multiple items repeat on the same level, SQL/XML generation module 306 picks the one that occurs first in the main mapping table 308.

In a third step, SQL/XML generation module 306 generates a column definition for each assigned logical data item in order to build an XMLTABLE function. Each column definition consists of a column name, a SQL type, and an XQuery expression. The column name is always that of the corresponding logical data item. Together with the SQL type, this name is obtained from the mapping table.

The XQuery expression in each column definition depends on two logical data items: (1) the logical item for which values are produced in this column definition, and (2) the logical item that contributed the row-generating expression (which provides the context for the column expressions). For both logical data items, two properties must be taken into account: (a) whether the logical item is mapped to one or multiple paths in the mapping table, and (b) whether the item occurs once or multiple times per document (i.e. repeat level 0 or >0). FIG. 8 depicts possible combinations for whether the logical item is mapped to one or multiple paths in the mapping table in accordance with an illustrative embodiment. Both items, (1) and (2), may be mapped to one or multiple paths. This leads to four categories, identified by roman numerals I to IV in FIG. 8. FIG. 9 depicts possible combinations for whether the items occur once or multiple times per document in accordance with an illustrative embodiment. Both items, (1) and (2), may occur either once per document (repeat level 0) or multiple times (repeat level>0). The four theoretical categories are numbered V to VIII. Because the properties in FIG. 8 and the properties in FIG. 9 are orthogonal, each category in FIG. 8 may occur together with each category in FIG. 9. This leads to 16 potential combinations. Some of the 16 categories may be handled similarly, and some actually do not occur at all.

The characteristics of an XMLTABLE function and its column definitions can be deduced after identifying the applicable categories in FIGS. 8 and 9. Nested type XMLTABLE functions may be built when categories VI and VIII apply. Category V in FIG. 9 leads to a "simple case" XMLTABLE function, regardless of properties in FIG. 8. The "simple case" was defined as the case when each XML element or attribute returned by the XMLTABLE function occurs at most once per document. Since category V implies repeat level 0 for all items, each item occurs at most once per document and the simple case applies.

Category VII never occurs. The reason is that, if the data item for the row-generating expression has repeat level 0, then all column definitions must also have repeat level 0. This is because SQL/XML generation module 306 selects the logical item with the greatest repeat level for the row-generating expression. Hence, a row generation expression with repeat level 0 may not exist at the same time as a column definition with repeat level>0. SQL/XML generation module 306 would have already swapped them.

If SQL/XML generation module 306 detects that a column definition is of category V in FIG. 9, query generation module 306 knows that a simple case XMLTABLE function must be constructed. This implies that the row-generating expression is the common prefix of all logical data items assigned to the XMLTABLE function. Hence, the relative path expression for the column definition is produced by removing this common prefix from the absolute path for logical data item in the column definition. As an example, consider the column definition for the logical data item "name" in SQL/XML query 704 of FIG. 7:

"name varchar(30) PATH 'ns1:Name'".

The column name "name" and the associated type "varchar (30)" are taken from the main mapping table 308. The XPath ns1:Name is built by removing the row-generating expression $CDOC/ns1:Customer from the element's absolute path. This column definition belongs to categories (I,V) in FIGS. 8 and 9.

If multiple paths are associated with a column's logical item, all relative paths are combined. The column definition for the logical item status in FIG. 7 falls into the categories (III, V). Category III implies that all relative paths for this logical data item are combined with the XQuery comma operator. At the same time, category V means that the relative paths are produced by removing the row-generating expression from each absolute path for this logical data item. Thus, the absolute paths/ns1:Customer/@Status and/ns1:Customer/ns1:Status are combined into the single column expression (ns1:Status, @Status). The column definitions for other simple case XMLTABLE functions (II, V) and (IV, V) are built identically.

For nested case XMLTABLE functions, column expressions are built differently. First, the logical data item that is also used for the row-generating expression has the column expression '.'. For all other items the column expression is produced as follows. The common prefix of the row-generating expression and the item's absolute path is removed from this absolute path. This produces a relative path. Then SQL/XML generation module 306 looks at the row-generating expression and counts the number of child steps after the common prefix. SQL/XML generation module 306 then adds the same number of parent steps to the beginning of the relative path for the column definition.

Once the XMLTABLE function is built, SQL/XML generation module 306 builds XMLEXISTS predicates from the original predicates for logical data items that reference XML elements or attributes. SQL/XML generation module 306 groups predicates on the same logical data items together in the parsing phase. SQL/XML generation module 306 then combines these grouped predicates in one XMLEXISTS predicate. If both sides of a predicate reference XML columns, such as a join predicate, SQL/XML generation module 306 uses the left hand side to decide which XMLEXISTS the predicate belongs to. Thus, all predicates that are combined in one XMLEXISTS have the same left hand side.

As a first step in generating an XMLEXISTS expression, SQL/XML generation module 306 parses the paths for all logical data items in the predicates. SQL/XML generation module 306 identifies namespace prefixes in namespace mapping table 310 and adds namespace declarations to the XMLEXISTS predicate as needed. SQL/XML generation module 306 sets the context for the XMLEXISTS expression as the path for the logical data item that is the common left hand side for all predicates in this XMLEXISTS. If multiple paths are associated with the left hand side, SQL/XML generation module 306 uses their common prefix as context. FIG. 7 shows one case where the full path $CDOC/ns1:Customer/ns1:Name is used as context.

As a second step in generating an XMLEXISTS expression, SQL/XML generation module 306 processes all right hand sides. Right hand sides in the original query may include, for example, logical data items, constants, and parameter markers. SQL/XML generation module 306 uses these logical data items, constants, and parameter markers as well as their data types to determine how a right hand side is added to the predicate. SQL/XML generation module 306 uses constant values as right hand sides with no or minimal further processing. SQL/XML generation module 306 replaces single quotes around constant string values with double quotes for use in the XMLEXISTS predicate. SQL/XML generation module 306 may have to convert the format of date and time values, depending on the formats and database system used. SQL/XML generation module 306 converts SQL parameter markers to generated variable names and adds a passing clause to the XMLEXISTS predicate:

XMLEXISTS('$ODOC/ns3:Order/ns3:CustomerRef
[.=$id]'
passing cast (? as integer) as "id")

If a right hand side is a logical data item that refers to an XML column, SQL/XML generation module 306 adds the associated path. If the item maps to multiple paths, SQL/XML generation module 306 adds all of the paths as disjunctions. SQL/XML generation module 306 adds logical data items referencing relational columns using the column name as an XQuery variable.

Throughout the translation process, SQL/XML generation module 306 is aware of and handles semantic differences between the original SQL statement (such as 702) and the generated SQL/XML query with embedded XQuery expressions (such as 704). Again, the generated SQL/XML statement is substantially equivalent in functionality to the original SQL statement. For example, the difference in data types is handled by relying on the SQL/XML standard and how it defines the casting from XQuery types to SQL types in XMLTABLE functions. Another aspect is that XML and XQuery are order preserving while SQL and the relational data model are unordered. One semantic difference to overcome is that of comparison operators. For example, the general comparison operator for equality "=" in XQuery has a different meaning than the equality comparison operator "=" in SQL. Someone skilled in the art knows that the equality comparison operator "=" in XQuery is defined by what is known as "existential semantics", which means that only one out of several items needs to fulfill the equality comparison. Translating the more rigorous SQL equality operator "=" into the XQuery equality operator "=" in an SQL/XML XMLEXISTS predicate can lead to extraneous rows in the result set that do not match the intention of the original SQL query. The problem exists whenever there is a predicate on a logical data item with repeat level>0. SQL/XML generation module 306 solves this problem as follows. Whenever SQL/XML generation module 306 detects in the mapping table 604 in FIG. 6 that the logical date item affected by a predicate has repeat level>0, SQL/XML generation module 306 places the predicate with the XQuery equality comparison "=" into the row-generating expression of the XMLTABLE and not into the XMLEXSIST predicates. The same applies to other comparison operators.

Finally, SQL/XML generation module 306 generates SQL/XML statement 324 from parts of SQL query or update 322 and the generated XMLQUERY functions, XMLTABLE functions, and XMLEXISTS predicates. Once SQL/XML generation module 306 generates SQL/XML statement 324 based on the user submitted SQL query or update 322, SQL/XML generation module 306 sends SQL/XML statement 324 to database engine 326. SQL/XML statement 324 is substantially equivalent in functionality to the SQL query or update 322. Database engine 326 executes SQL/XML statement 324 in order to produce results 328, which are then provided to the user via user interface 320. In an embodiment, SQL/XML generation module 306 may connect to a database engine and execute the generated SQL/XML statement, or SQL/XML generation module 306 may be directly and closely embedded within a database engine, or SQL/XML generation module 306 may simply provide the generated SQL/XML statement to an application which can send the generated statement to a database engine at a later point in time. These are just examples, not restrictions, and other deployments of SQL/XML generation module 306 are possible without changing the general idea of the invention.

In addition to generating new SQL/XML queries from user submitted SQL queries, SQL/XML generation module 306 may also generate SQL/XMLupdate statements that modify XML data, relational data, or both. SQL/XML generation module 306 generates SQL/XML update statements using similar concepts as those used for generating SQL/XML queries. SQL/XML generation module 306 generates XQuery transform expressions or some other possibly database-dependent notation that specifies updates of XML elements or attributes. SQL/XML generation module 306 assembles necessary XPath expressions from one or multiple paths in main mapping table 308, which contains all necessary information to construct SQL/XML updates. SQL/XML generation module 306 transforms predicates on XML elements or attributes depending on the repeat level. SQL/XML generation module 306 converts the predicates to XMLEXISTS predicates if the element or attribute occurs at most once per document (repeat level 0). A predicate on an element or attribute with repeat level>0 typically means that only one of multiple occurrences of a node should be updated. In this case the predicate is also applied in the generated XQuery transform expression. FIG. 10 depicts an exemplary SQL update statement 1002 and a corresponding exemplary SQL/XML update statement 1004 in accordance with an illustrative embodiment.

FIG. 11 shows an example where a logical data item, "price," is updated in accordance with an illustrative embodiment. SQL update 1102 is restricted by a predicate on the logical data item "product" 1104, which occurs multiple times. SQL/XML generation module 306 converts the predicate to an XMLEXISTS predicate in where clause 1106 of SQL/XML update statement 1108. Where clause 1106 allows the database engine to use an XML index to efficiently locate the required order documents. The predicate is also applied in the XQuery transform expression, to update the price of the correct product within a given order, instead of updating all product within an order.

To summarize, the novelties in our invention include:

The ability to use a simple relational query language (such as SQL) or a GUI to express queries and updates against hierarchical (i.e. non-relational) data.

The ability to use a simple relational query language (such as SQL) or a GUI to express queries and updates against a mix consisting of relational and hierarchical (i.e. non-relational) data.

The translation of SQL-like queries and updates, which are not expressed in navigational terms, into correct queries and updates that navigate hierarchical data.

The design of mapping tables that map XML values and namespaces to logical data item names with a SQL data type and other metadata.

The automatic generation of this mapping information, as well as the automatic re-generation of the mapping table to handle schema evolution and data variability.

The ability to perform any of the above novelties for arbitrarily nested but non-recursive XML data that does not need to conform to a simplistic, regular, or simple format.

FIG. 12 depicts an exemplary flow diagram of the operation performed by the mapping generation module of the Structured Query Language/Extensible Markup Language (SQL/XML) generator in accordance with an illustrative embodiment. As the operation begins, the SQL/XML generator is initialized (step 1202) The mapping generation module then determines if a master document exists with which to build the namespace mapping table and the main mapping table (step 1204). If at step 1204 a master table does not exist, then the mapping generation module determines if there are one or more instance documents with which to build the namespace mapping table and the main mapping table (step 1206). If at step 1206 one or more instance documents do not exist, then the mapping generation module determines if there is an XML schema with which to build the namespace mapping table and the main mapping table (step 1208). If at step 1208 an XML schema does not exist, then the SQL/XML generator sends an error message to the administrator indicating no documents exist with which to build the mapping tables (step 1210), with the operation ending thereafter.

If at step 1204 a master document exists, then the mapping generation module retrieves the master document (step 1212). The mapping generation module generates a namespace mapping table (step 1214), which is detailed in FIG. 13 below. The mapping generation module may then generate an intermediate mapping table in order to generate the main mapping table (step 1216), which is detailed in FIGS. 14A, 14B, and 14C below. Then mapping generation module generates main mapping table (step 1218), which will be detailed in FIG. 15. The use of an intermediate mapping table 1216 is an optional step but, in an embodiment, an intermediate mapping table may help simplify the generation of the final mapping table 1218. If an intermediate mapping table 1216 is used, the intermediate mapping table does not necessarily have to be materialized but may be a transient data structure. Once the namespace mapping table and the main mapping table are populated, mapping generation module presents logical data item names associated with the main mapping table to a user for use in SQL queries or updates (step 1220), with the operation ending thereafter. If at step 1206 one or more instance documents exist, then the mapping generation module retrieves the one or more instance documents (step 1222), with the operation proceeding to step 1214 thereafter. If at step 1208 an XML schema exists, then the mapping generation module retrieves the XML schema (step 1224), with the operation proceeding to step 1214 thereafter.

Figures 13, 14A:
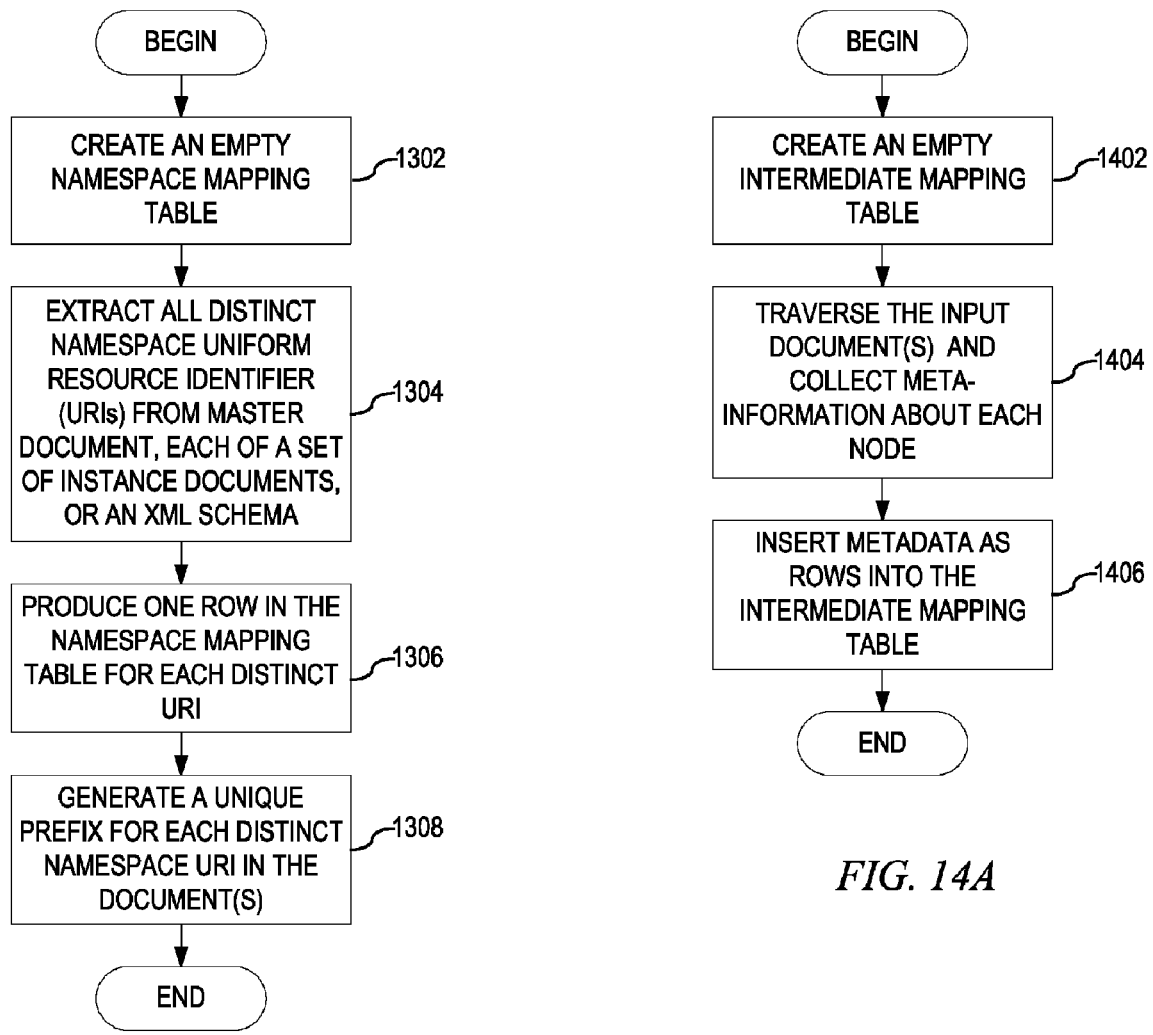
FIG. 13 depicts an exemplary flow diagram of the operation performed by the mapping generation module in generating the namespace mapping table in accordance with an illustrative embodiment.
FIG. 14A depicts an exemplary flow diagram of the operation performed by the mapping generation module in generating the intermediate mapping table in accordance with an illustrative embodiment.

FIG. 13 depicts an exemplary flow diagram of the operation performed by the mapping generation module in generating the namespace mapping table of step 1214 of FIG. 12 in accordance with an illustrative embodiment. The flow diagram in FIG. 13 illustrates the execution of exemplary pseudo code 402 and 404 in FIG. 4. As the operation begins, the mapping generation module generates an empty namespace mapping table (step 1302), or re-uses an existing namespace mapping table. The mapping generation module then extracts all distinct namespace Uniform Resource Identifiers (URIs) from a master document, a set of instance documents, or an XML schema (step 1304). For each of these distinct URIs, the mapping generation module produces one row in the namespace mapping table (step 1306). The mapping generation module then generates a unique prefix for each distinct namespace URI in the document(s) (step 1308), with the operation ending thereafter. Although FIG. 13 shows that steps 1304, 1306, and 1308 are performed as a sequence, they may also be performed in parallel or as a single complex step that performs all three tasks at once. For example, the exemplary pseudo code 404 in FIG. 4 is a single SQL statement that performs the steps 1304, 1306, and 1308 simultaneously.

FIG. 14A depicts an exemplary flow diagram of the operation performed by the mapping generation module in generating the intermediate mapping table of step 1216 of FIG. 12 in accordance with an illustrative embodiment. Again, the use of an intermediate mapping table is optional but, in an embodiment, an intermediate mapping table may help simplify the generation of the final mapping table. As the operation begins, the mapping generation module generates an empty intermediate mapping table (step 1402), or re-uses an existing intermediate mapping table. The mapping generation module traverses the input document(s) and collects meta-information about each node (step 1404) The mapping generation module then inserts metadata as rows into the intermediate mapping table (step 1406), with the operation ending thereafter.

Figure 14B:
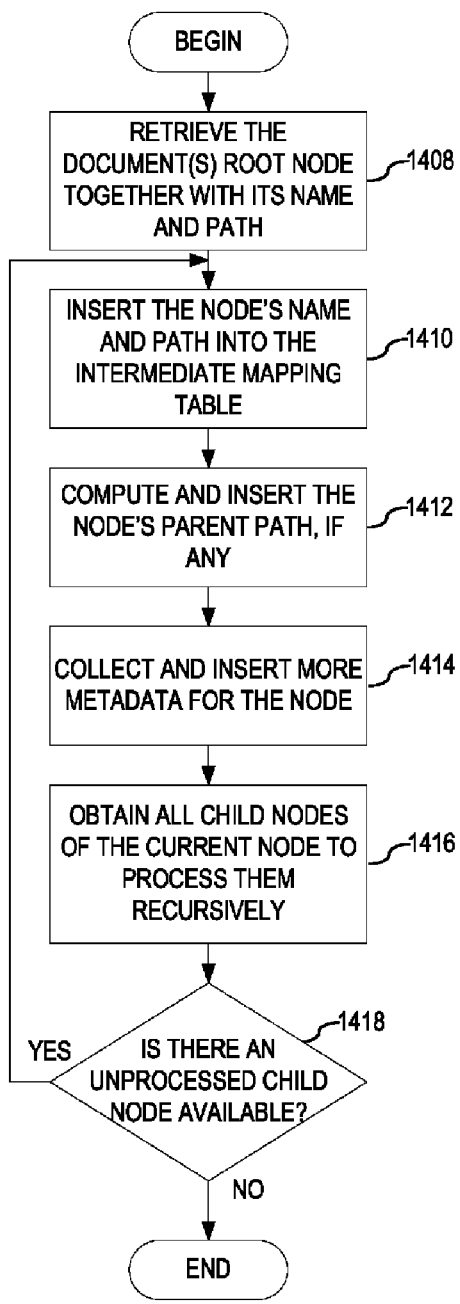
FIG. 14B depicts an exemplary flow diagram of the operation performed by the mapping generation module traversing a set of input document(s), a master document, or an XML Schema, and collecting meta-information about each node in accordance with an illustrative embodiment.

FIG. 14B depicts an exemplary flow diagram of the operation performed by the mapping generation module traversing a set of input document(s), as master document, or an XML Schema, and collecting meta-information about each node of step 1404 of FIG. 14A in accordance with an illustrative embodiment. As the operation begins, the mapping generation module retrieves the document(s) root node, together with the root node's name and path (step 1408). The mapping generation module inserts the name and path of the node that is currently being processed into the intermediate mapping table (step 1410). The mapping generation module then computes and inserts the node's parent path, if any, into the intermediate mapping table (step 1412). The mapping generation module then collects and inserts additional metadata for the node (step 1414). The mapping generation module obtains all child nodes of the current node to process them recursively (step 1416). The mapping generation module then determines if there is any unprocessed child node available (step 1418). If at step 1418 there is an unprocessed child node available, then the operation returns to step 1410. If at step 1418 there is not another unprocessed child node available, then the operation ends.

Figure 14C:
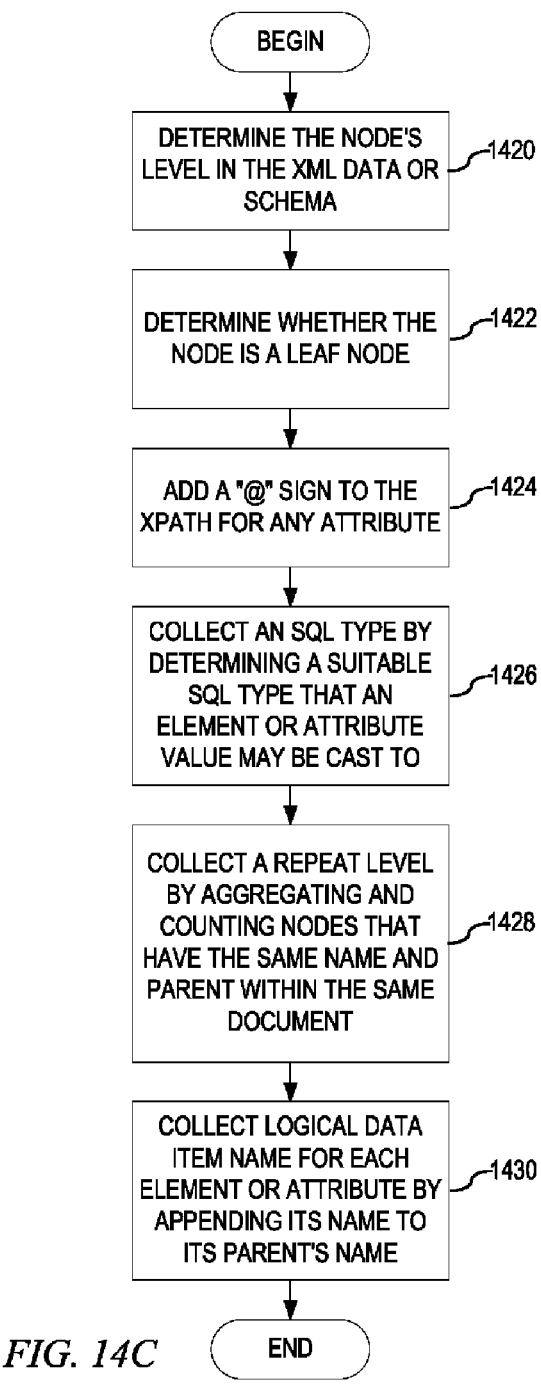
FIG. 14C depicts an exemplary flow diagram of the operation performed by the mapping generation module collecting and inserting more metadata for each node in accordance with an illustrative embodiment.

FIG. 14C depicts an exemplary flow diagram of the operation performed by the mapping generation module collecting and inserting more metadata for each node of step 1414 of FIG. 14B in accordance with an illustrative embodiment. As the operation begins, the mapping generation module determines the node's level in the XML data or schema (step 1420). The node's level represents the node level in the tree that is initialized with 1 for the root and incremented for each level of the recursion. The mapping generation module then determines whether the node is a leaf node (step 1422). The mapping generation module executes an XQuery expression to add a "@" sign to the xpath in intermediate mapping table if the node is an attribute node (step 1424). The mapping generation module then collects an SQL type by determining a suitable SQL type that the value of the node may be cast to (step 1426). The mapping generation module collects a repeat level by aggregating and counting nodes that have the same name and parent within the same document (step 1428). Finally, the mapping generation module may collect a logical data item name in the intermediate mapping table for each element or attribute by appending its name to its parent's name (step 1430), with the operation ending thereafter.

Figure 15:
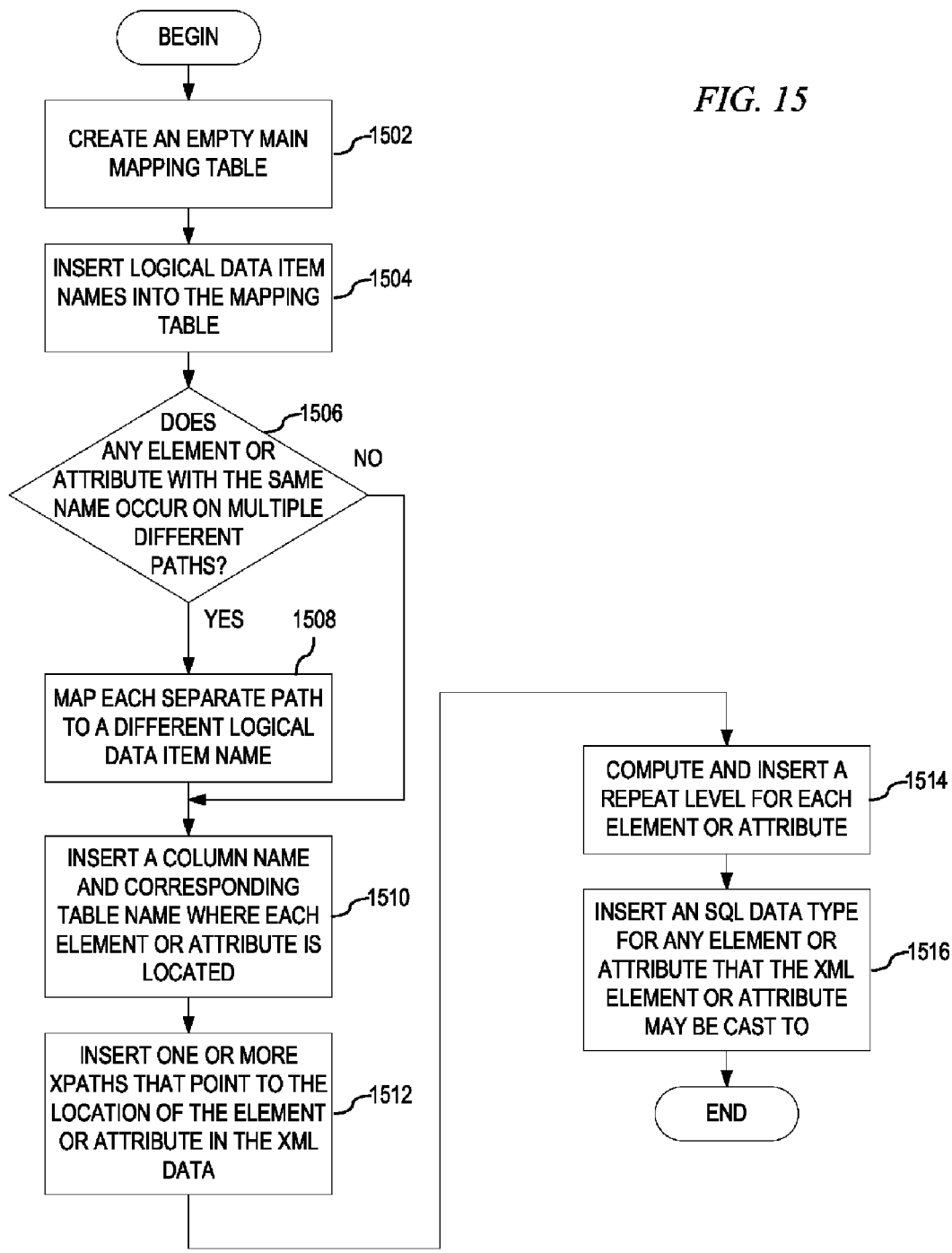
FIG. 15 depicts an exemplary flow diagram of the operation performed by the mapping generation module in generating the main mapping table in accordance with an illustrative embodiment.

FIG. 15 depicts an exemplary flow diagram of the operation performed by the mapping generation module in generating the main mapping table of step 1218 of FIG. 12 in accordance with an illustrative embodiment. As the operation begins, the mapping generation module generates an empty main mapping table (step 1502), or re-uses an existing main mapping table. The mapping generation module inserts logical data item names into the main mapping table for all nodes in the intermediate mapping table (step 1504). The mapping generation module may choose to exclude non-leaf elements from the main mapping table, such as lineitem, and list only attributes and leaf elements, i.e. elements that only contain text nodes with the actual business data. The mapping generation module then determines if any element or attribute with the same name occurs on multiple different paths (step 1506). If at step 1506 an element or attribute with the same name occurs on multiple paths, then the mapping generation module maps each of these separate paths to a different logical data item name (step 1508). In an illustrative embodiment, the different logical data item names may be generated in step 1508 by concatenating the name of the node with the name of the parent of the node.

From step 1508 or if at step 1506 an element or attribute with the same name does not occur on multiple paths, then the mapping generation module inserts a column name and corresponding table name where each element or attribute is located (step 1510). The mapping generation module then inserts one or more XPaths that point to the location of the element or attribute in the XML data (step 1512). XPaths 612 in FIG. 6 may also include namespace prefixes as needed. The mapping generation module computes and inserts a repeat level for each element or attribute (step 1514). The repeat level represents the deepest level in an XPath at which an element or attribute can occur more than once. The mapping generation module finally inserts an SQL data type for any element or attribute that the XML element or attribute may be cast to (step 1516), with the operation ending thereafter.

Figure 16:
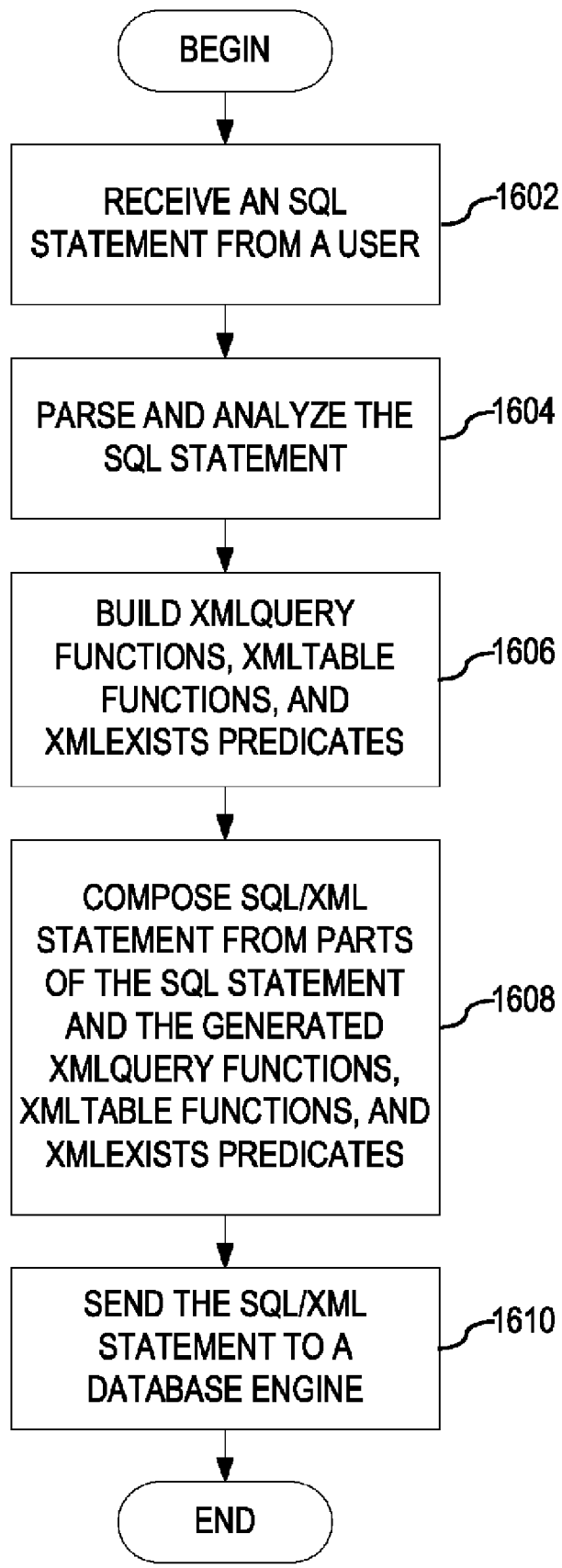
FIG. 16 depicts an exemplary flow diagram of the operation performed by the Structured Query Language/Extensible Markup Language (SQL/XML) generator in accordance with an illustrative embodiment.

FIG. 16 depicts an exemplary flow diagram of the operation performed by the Structured Query Language/Extensible Markup Language (SQL/XML) generator in accordance with an illustrative embodiment. As the operation begins, the SQL/XML generation module receives an SQL statement that may be either a query or an update from a user or application or user interface (step 1602). The SQL statement is expressed in terms of the logical data items that are exposed by exposing a set of mapping tables that list names of logical data items together with information about the logical data items. In order to generate the SQL/XML statement, the SQL/XML generation module parses and analyzes the SQL statement (step 1604). The SQL/XML generation module then builds XMLQUERY functions, XMLTABLE functions, and XMLEXISTS predicates to retrieve, filter, or update XML elements and attributes as needed (step 1606). The operations to parse and analyze the original SQL statement, to build XMLTABLE functions, and to build XMLEXISTS predicates are detailed in FIGS. 17, 18, and 19 below, respectively.

The SQL/XML generation module then generates a SQL/XML statement from parts of the original SQL statement and the generated XMLQUERY functions, XMLTABLE functions, and XMLEXISTS predicates (step 1608). Once the SQL/XML generation module generates a SQL/XML query statement based on the user submitted SQL statement, the SQL/XML generation module may then send the SQL/XML statement to a database engine (step 1610), so that the database engine may execute the SQL/XML statement in order to produce results, which are then provided to the user via user interface. The SQL/XML statement generated by the SQL/XML generation module is substantially equivalent in functionality to the SQL statement. The operation terminates after the SQL/XML generation module sends the SQL/XML statement to a database engine.

Figure 17:
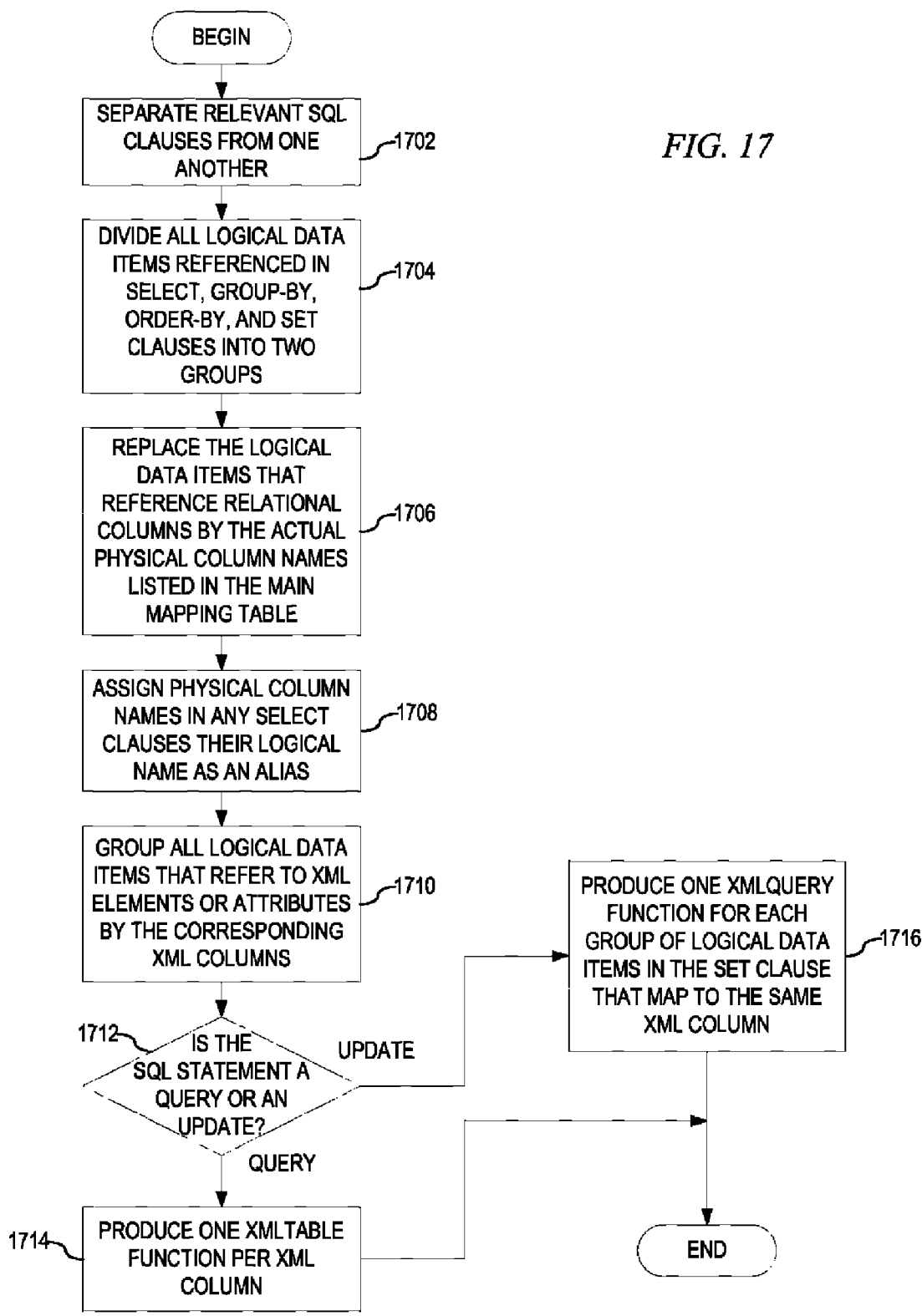
FIG. 17 depicts a detailed operation of parsing and analyzing the SQL query or update in accordance with an illustrative embodiment.

FIG. 17 depicts a detailed operation of parsing and analyzing the SQL statement performed in step 1604 of FIG. 16 in accordance with an illustrative embodiment. As the operation begins, the SQL/XML generation module separates relevant SQL clauses from one another, including clauses such as select, from, where, group-by, and order-by clauses in SQL queries as well as set clauses in SQL updates (step 1702). The SQL/XML generation module divides all logical data items referenced in the select, group-by, order-by, and set clauses into two groups, i.e. those that map to relational columns and those that map to XML columns (step 1704). The SQL/XML generation module replaces the logical data items that reference relational columns by the actual physical column names listed in the main mapping table (step 1706). The SQL/XML generation module assigns physical column names in any select clauses their logical name as an alias (step 1708). The SQL/XML generation module groups all logical data items that refer to XML elements or attributes by the corresponding XML columns (step 1710). The SQL/XML generation module then determines whether the original SQL statement being processed is a query or an update (step 1712). If at step 1712 the SQL statement being processed is a query, then the SQL/XML generation module uses the logical items that map to the same XML column to produce one XMLTABLE function per XML column, where each logical data item is represented by one column definition (step 1714), with the operation terminating thereafter. In this way, the SQL/XML generation module assigns a set of logical data items to each XMLTABLE function that needs to be generated. If at step 1712 the SQL statement being processed is an update, then the SQL/XML generation module produces one XMLQUERY function for each group of logical data items in the set clause that map to the same XML column (step 1716), with the operation terminating thereafter. In this way, the SQL/XML generation module may produce one XQuery Update expression, embedded in an XMLQUERY function, for each XML column that requires updating.

Figure 18:
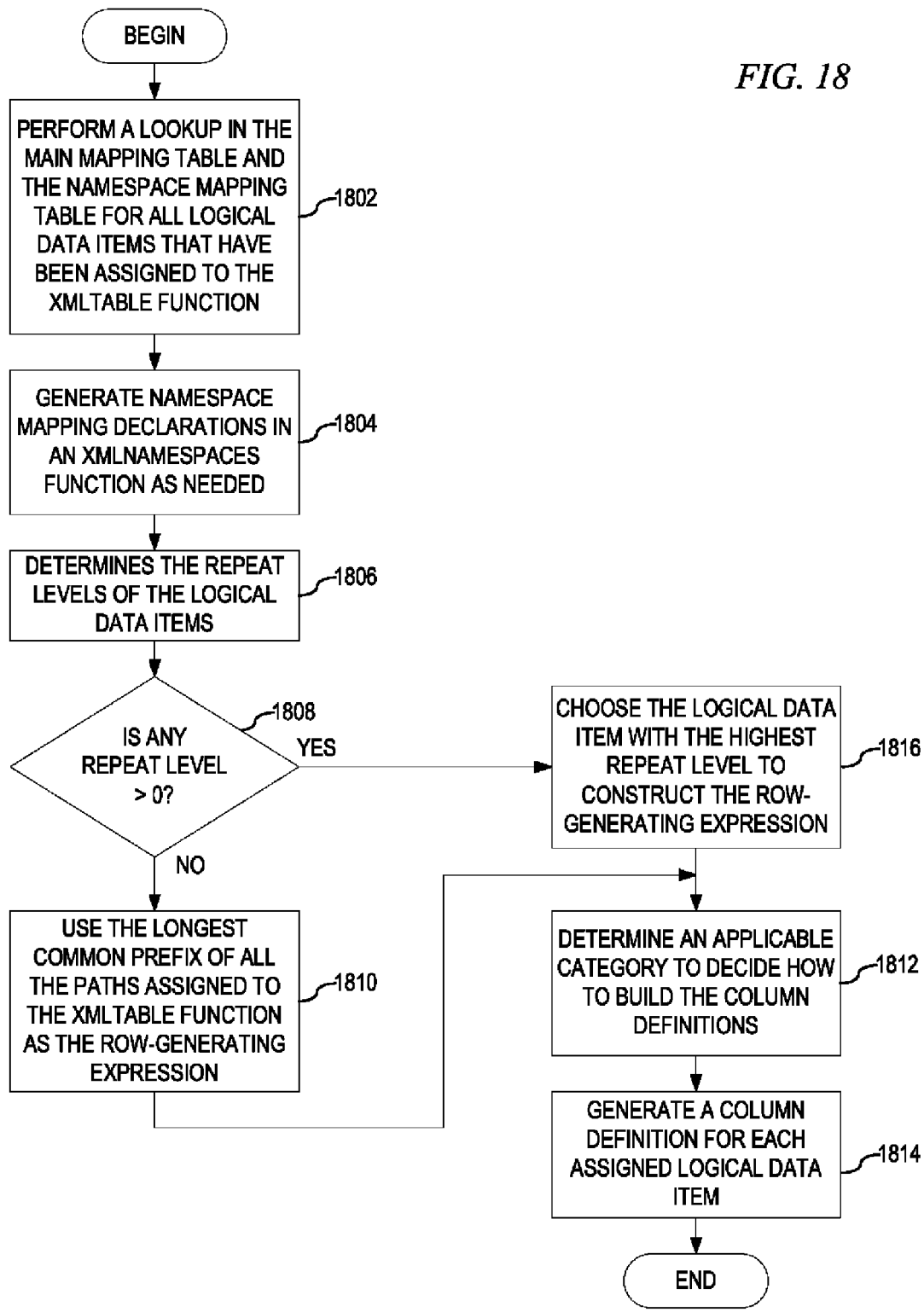
FIG. 18 depicts an exemplary flow diagram of the operation performed by the Structured Query Language/Extensible Markup Language (SQL/XML) generator in building XML-TABLE functions in accordance with an illustrative embodiment.

FIG. 18 depicts an exemplary flow diagram of the operation performed by the Structured Query Language/Extensible Markup Language (SQL/XML) generator in building the XMLTABLE functions of step 1606 of FIG. 16 in accordance with an illustrative embodiment. As the operation begins, the SQL/XML generation module performs a lookup in the main mapping table and the namespace mapping table for all logical data items that have been assigned to the XMLTABLE function (step 1802). This lookup enables the SQL/XML generation module to obtain all relevant information for each logical data item involved in building the XMLTABLE function. The SQL/XML generation module then generates namespace mapping declarations in an XMLNAMESPACES function as needed (step 1804). The SQL/XML generation module then determines the repeat levels of the logical data items, based on the information obtained from the mapping table (step 1806). The SQL/XML generation module determines whether the repeat level indicates a "simple case", indicated by repeat level 0, or a "nested case", indicated by repeat level greater than 0, respectively (step 1808). If at step 1808 the SQL/XML generation module determines that the repeat level of all logical data items for the XMLTABLE function is 0, then the SQL/XML generation module uses the longest common prefix of all the paths assigned to the XMLTABLE function as the row-generating expression (step 1810).

The SQL/XML generation module then determines an applicable category, category I though VIII from FIGS. 8 and 9, to decide how to build the column definitions (step 1812). Based on the determined category, the SQL/XML generation module generates a column definition for each assigned logical data item (step 1814), with the operation terminating thereafter. If at step 1808 the SQL/XML generation module determines that the repeat level of at least one logical data item for the XMLTABLE function is greater than 0, then the SQL/XML generation module chooses a logical data item with the highest repeat level to construct the row-generating expression (step 1816), with the operation proceeding to step 1812 thereafter.

Figure 19:
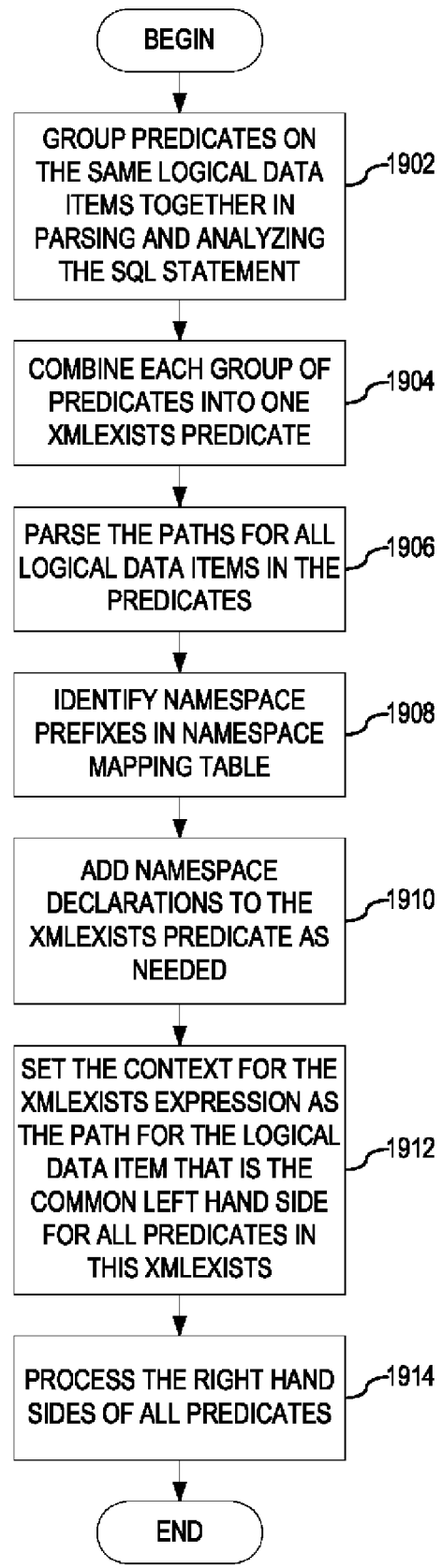
FIG. 19 depicts an exemplary flow diagram of the operation performed by the Structured Query Language/Extensible Markup Language (SQL/XML) generator in building XMLEXISTS predicates in accordance with an illustrative embodiment.

FIG. 19 depicts an exemplary flow diagram of the operation performed by the Structured Query Language/Extensible Markup Language (SQL/XML) generator in building the XMLEXISTS predicates of step 1606 of FIG. 16 in accordance with an illustrative embodiment. As the operation begins, the SQL/XML generation module parses the predicates in the original SQL statement and groups them by the logical data items that they refer to (step 1902). The SQL/XML generation module combines each group of predicates into a separate XMLEXISTS predicate (step 1904). The SQL/XML generation module parses the paths for all logical data items in the predicates (step 1906). The SQL/XML generation module identifies namespace prefixes in namespace mapping table (step 1908) and adds namespace declarations to the XMLEXISTS predicate as needed (step 1910). The SQL/XML generation module sets the context for the XMLEXISTS expression as the path for the logical data item that is the common left hand side for all predicates in this XMLEXISTS (step 1912). The SQL/XML generation module then processes the right hand sides of all XMLEXISTS predicates (step 1914) with the operation terminating thereafter.

Thus, the illustrative embodiments provide a mechanism for generating Structured Query Language/Extensible Markup Language (SQL/XML) statements automatically. The mechanism of the illustrative embodiments works for SQL/XML queries and for SQL/XML updates. The input to the mechanism of the illustrative embodiments may be a simple representation of a user query or update. For example, the input may be a regular SQL statement that uses logical data item names as column names in the select, where, group by, and order by clauses, as well as in the set clause in the case of updates. The SQL statement may be translated to SQL/XML using a mapping from logical data item names to their physical locations, such as a relational column name or an XML column name with an XPath expression, all required namespaces, and other metadata. For SQL/XML updates, XQuery transform expressions are generated and included in SQL update statements.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for generating Structured Query Language/Extensible Markup Language (SQL/XML) statements, the method comprising:

receiving, by an SQL/XML generation module, an SQL statement wherein the SQL statement is expressed in terms of logical data items that are exposed by exposing a set of mapping tables that list names of the logical data items together with information about the logical data items;

parsing and analyzing, by the SQL/XML generation module, the SQL statement;

generating, by the SQL/XML generation module, based on a main mapping table and a namespace mapping table, a set of XMLQUERY functions, a set of XMLTABLE functions, and a set of XMLEXISTS predicates to retrieve, filter, or update at least one of XML documents or relational data;

generating, by the SQL/XML generation module, at least one SQL/XML statement from parts of the SQL statement and the generated set of XMLQUERY functions, the set of XMLTABLE functions, and the set of XMLEXISTS predicates, wherein the at least one SQL/XML statement is substantially equivalent in functionality to the SQL statement; and sending, by the SQL/XML generation module, the at least one SQL/XML statement to a database engine for execution.

2. The method of claim 1, wherein parsing and analyzing the SQL statement further comprises:

separating, by the SQL/XML generation module, relevant SQL clauses in the SQL statement from one another, wherein the relevant SQL clauses include at least one of a select clause, from clause, where clause, group-by clause, and order-by clause in a SQL query or update statement or a set, clause in the SQL update statement;

dividing, by the SQL/XML generation module, all logical data items referenced in the at least one select clause, group-by clause, order-by, or set clause into two groups, wherein the two groups are a group that maps to relational columns and a group that maps to XML columns;

replacing, by the SQL/XML generation module, the logical data items that reference the relational columns by the actual physical column names listed in the main mapping table;

assigning, by the SQL/XML generation module, physical column names in any select clause then logical data item names as an alias;

grouping, by the SQL/XML generation module, all logical data items that for to elements or attributes by corresponding XML columns into groups of logical data item so that each group of logical data items contains data items that refer to a same XML column;

determining, by the SQL/XML generation module, whether the SQL statement being processed is a query or an update;

responsive to the SQL statement being a query, producing, by the SQL/XML generation module, one XMLTABLE function per XML column using the logical data items that map to a same XML column, wherein each logical data hem is represented by one column definition; and responsive to the SQL statement being a update, producing, by the SQL/XML generation module, one XMLQUERY function for each group of logical data items in the set clause that map to a same XML column.

3. The method of claim 1, wherein generating the sat of XMLTABLE functions further comprises:

performing, by the SQL/XML generation module, a lookup in the main mapping table and the namespace mapping table for all logical data hems that have been assigned to the XMLTABLE function;

generating, by the SQL/XML generation module, namespace mapping declarations in an XML-NAMESPACES function;

examining, by the SQL/XML generation module, a repeat level of each logical data item;

determining, by the SQL/XML, generation module, whether the repeat level indicates a simple case or a nested case;

responsive to the repeat level indicating a simple case, using, by the SQL/XML generation module, a longest common prefix of all the paths assigned to the XMLTABLE function as the row-generating expression;

responsive to the repeat level indicating a nested case, choosing, by the SQL/XML generation module, a logical data item with the highest repeat level to construct the row-generating expression;

determining, by the SQL/XML generation module, an applicable category for building the column definitions;

based on the determined category, generating, by the SQL/XML generation module, a column definition for each assigned logical data item.

4. The method of claim 1, wherein generating the set of XMLEXISTS predicates further comprises:

grouping, by the SQL/XML generation module, predicates on the same logical data items together when parsing and analyzing the SQL statement;

combining, by the SQL/XML generation module, each group of predicates into separate XMLEXISTS predicates;

parsing, by the SQL/XML generation module, the paths for all logical data items in the separate XMLEXISTS predicates;

identifying, by the SQL/XML generation module, namespace prefixes in namespace mapping table for each XMLEXISTS predicate in the separate XMLEXISTS predicates;

adding, by the SQL/XML generation module, namespace declarations to each of the XMLEXISTS predicates;

setting, by the SQL/XML generation module, the context for the XMLEXISTS expression as the path for the logical data item that is the common left hand side for each XMLEXISTS predicate; and processing, by the SQL/XML generation module, the right hand side of each XMLEXISTS predicate.

5. The method of claim 1, wherein the namespace mapping table is generated by:

extracting, by a mapping generation module, all distinct namespace Uniform Resource Identifiers (URIs) from XML data, wherein the XML data is at least one of a master document, a set of instance documents, or an XML schema;

producing, by the mapping generation module, one row in the namespace mapping table for each distinct URI;

generating, by the mapping generation module, a unique prefix for each distinct URI; and adding, by the mapping generation module, each distinct URI and associated unique prefix to the namespace mapping table.

6. The method of claim 1, wherein the main mapping table is generated by:

inserting, by a mapping generation module, a set of logical data item names into the main mapping table for all leaf elements from XML data, wherein the XML data is at least one of is master document, a set of instance documents, or an XML schema;

determining, by the mapping generation module, whether any element or attribute with the same name occurs on multiple different paths;

responsive to an element or an attribute with the same name occurring on multiple paths, mapping, by the mapping generation module, each of these multiple paths to a different logical data item name in the main mapping table;

insetting, by the mapping generation module, a column name and corresponding table name where the element or the attribute is located;

inserting, by the mapping generation module, one or more XPaths that point to a location of the element or the attribute in the XML data;

inserting, by the mapping generation module, a repeat level for each element or attribute that represents the deepest level in an XPath at which the element or the attribute occurs more than once or a zero if the element or attribute can never occur more than once; and inserting by the mapping generation module, an SQL data type for any element or attribute that the element or attribute may be cast to.

7. The method of claim 6, wherein generating the main mapping table further comprises first generating an intermediate mapping table that is used to generate the main mapping table.

8. The method of claim 7, wherein generating the intermediate mapping table further comprises:

traversing, by the mapping generation module, the XML data to collect meta-information about each node; and inserting, by the mapping generation module, the metadata information as rows into the intermediate mapping table.

9. The method of claim 8, wherein traversing the XML data to collect the meta-information about each node further comprises:

retrieving, by the mapping generation module, a node of the XML data together with the root node's name and path;

inserting, by the mapping generation module, the node's name and path into the intermediate mapping table;

computing and inserting, by the mapping generation module, the node's parent path, if any, into the intermediate mapping table;

collecting and inserting, by the mapping generation module, additional metadata for the node into the intermediate mapping table;

obtaining, by the mapping generation module, all child nodes of the node; and processing, by the mapping generation module, each of the child nodes recursively using the same method.

10. The method of claim 9, wherein collecting and inserting the additional metadata for each node further comprises:
- determining by the mapping generation module, a node's level in the XML data;
- determining, by the mapping generation module, whether the node is a leaf node based on the node's level;
- executing, by the mapping generation module, an XQuery expression to add a "@" sign to the xpath in intermediate mapping table for any attribute node;
- collecting, by the mapping generation module, an SQL type by determining a suitable SQL type that each element or attribute value may be cast to;
- collecting, by the mapping generation module, a repeat level by aggregating and counting nodes that have the same name and parent within the XML data; and
- collecting, by the mapping generation module, logical data item names in the intermediate mapping table for each element or attribute by appending the element or the attributes name to a parent name of the element or the attribute.

11. A computer program product comprising a non-transitory computer recordable medium having a computer readable program recorded thereon, wherein the computer readable program, when executed on a computing device, causes the computing device to:
- receive an SQL statement, wherein the SQL statement is expressed in terms of logical data items that are exposed by exposing a set of mapping tables that list names of the logical data items together with information about the logical data items;
- parse and analyze the SQL statement;
- generate, based on a main mapping table and a namespace mapping table, a set of XMLQUERY functions, a set of XMLTABLE functions, and a set of XMLEXISTS predicates to retrieve, filter, or update at least one of XML documents or relational data;
- generate at least one SQL/XML statement from parts of the SQL statement and the generated set, of XMLQUERY functions, the set of XMLTABLE functions, and the set of XMLEXISTS predicates, wherein the at least one SQL/XML statement is substantially equivalent in functionality to the SQL statement; and
- send the at least one SQL/XML statement to a database engine for execution.

12. The computer program product of claim 11, wherein the computer readable program to parse and analyze the SQL statement further causes the computing device to:
- separate relevant SQL clauses in the SQL statement from one another, wherein the relevant SQL clauses include at least one of a select clause, from clause, where clause, group-by clause, and order-by clause in a SQL query or update statement or a set clause in the SQL update statement;
- divide all logical data items referenced in the at least one select clause, group-by clause, order-by or set clause into two groups, wherein the two groups are a group that maps to relational columns and a group that maps to XML columns;
- replace the logical data items that reference the relational columns by the actual physical column names listed in the main mapping table;
- assign physical column names in any select clause their logical data item names as an alias;
- group all logical data items that refer to elements or attributes by corresponding XML columns into groups of logical data items so that each group of logical data items contains data items that refer to a same XML column;
- determine whether the SQL statement being processed is a query or an update;
- responsive to the SQL statement being a query, produce one XMLTABLE function per XML column using the logical data items that map to a same XML column, wherein each logical data item is represented by one column definition; and
- responsive to the SQL statement being, a update, produce one XMLQUERY function for each group of logical data items in the set clause that map to a same XML column.

13. The computer program product of claim 11, wherein the computer readable program to generate the set of XMLTABLE functions further causes the computing device to:
- perform a lookup in the main mapping table and the namespace mapping table for all logical data items thin have been assigned to the XMLTABLE function;
- generate namespace mapping declarations in an XMLNAMESPACES function;
- examine a repeat level of each logical data item;
- determine whether the repeat level indicates a simple case or a nested case;
- responsive to the repeat level indicating a simple case, use a longest common prefix of all the paths assigned to the XMLTABLE function as the row-generating expression;
- responsive to the repeat level indicating a nested case, choose a logical data item with the highest repeat level to construct the row-generating expression;
- determine an applicable category for building the column definitions;
- based on the determined category, generate a column definition for each assigned logical data item.

14. The computer program product of claim 11, wherein the computer readable program to generate the set of XMLEXISTS predicates further causes the computing device to:
- group predicates on the same logical data items together when parsing and analyzing the SQL statement;
- combine each group of predicates into separate XMLEXISTS predicates;
- parse the paths for all logical data items in the separate XMLEXISTS predicates;
- identify namespace prefixes in namespace mapping table for each XMLEXISTS predicate in the separate XMLEXISTS predicates;
- add namespace declarations to each of the XMLEXISTS predicates;
- set the context for the XMLEXISTS expression as the path for the logical data item that is the common left hand side for each XMLEXISTS predicate; and
- process the right hand side of each XMLEXISTS predicate.

15. The computer program product of claim 11, wherein the computer readable program generates the namespace mapping table by causing the computing device to:
- extract all distinct namespace Uniform Resource Identifiers (URIs) from XML data, wherein the XML data is at least one of a master document, a set of instance documents, or an XML schema;
- produce one row in the namespace mapping table for each distinct URI;
- generate a unique prefix for each distinct URI; and add each distinct URI and associated unique prefix to the namespace mapping table.

16. The computer program product of claim 11, wherein the computer readable program generates the main mapping table by causing the computing device to:
   insert a set of logical data item names into the main mapping table for all leaf elements from XML data, wherein the XML data is at least one of a master document, a set of instance documents, or an XML schema;
   determine whether any element or attribute with the same name occurs on multiple different paths;
   responsive to an element or an attribute with the same name occurring on multiple paths, map each of these multiple paths to a different logical data item name in the main mapping table;
   insert a column name and corresponding table name where the element or the attribute is located;
   insert one or more XPaths that point to a location of the element or the attribute in the XML data;
   insert a repeat level for each element or attribute that represents the deepest level in an XPath at which the element or the attribute occurs more than once or a zero if the element or attribute can never occur more than once; and
   insert an SQL data type for any element or attribute that the element or attribute may be cast to.

17. The computer program product of claim 16, wherein the computer readable program to generate the main mapping table further causes the computing device to first generate an intermediate mapping table that is used to generate the main mapping table and wherein the computer readable program to generate the intermediate mapping table further causes the computing device to:
   traverse the XML data to collect meta-information about each node; and
   insert the metadata information as rows into the intermediate mapping table.

18. The computer program product of claim 17, wherein the computer readable program to traverse the XML data to collect the meta-information about each node further causes the computing device to:
   retrieve a node of the XML data together with the root node's name and path;
   insert the node's name and path into the intermediate mapping table;
   compute and insert the node's parent path, if any, into the intermediate mapping table;
   collect and insert additional metadata for the node into the intermediate mapping table;
   obtain all child nodes of the node; and
   process each of the child nodes recursively using the same computer readable program.

19. The computer program product of claim 18, wherein the computer readable program to collect and insert the additional metadata for each node further causes the computing device to:
   determine a node's level in the XML data;
   determine, whether the node in a leaf node based on the node's level;
   execute an XQuery expression to add a "@" sign to the xpath in intermediate mapping table for any attribute node;
   collect an SQL type by determining a suitable SQL type that each element or attribute value may be cast to;
   collect a repeat level by aggregating and counting nodes that have the same name and parent within the XML data; and
   collect logical data item names in the intermediate mapping table for each element or attribute by appending the element or the attributes name to a parent name of the element or the attribute.

20. An apparatus, comprising:
   a processor; and
   a memory coupled to the processor, wherein the memory comprises instructions which, when executed by the processor, cause the processor to:
   receive an SQL statement, wherein the SQL statement is expressed in terms of logical data items that are exposed by exposing a set of mapping tables that list names of the logical data items together with information about the logical data items;
   parse and analyze the SQL statement;
   generate, based on a main mapping table and a namespace mapping table, a set of XMLQUERY functions, a set of XMLTABLE functions, and a set of XMLEXISTS predicates to retrieve, filter, or update at least one of XML documents or relational data;
   generate at least one SQL/XML statement from parts of the SQL statement and the generated set of XMLQUERY functions, the set of XMLTABLE functions, and the set of XMLEXISTS predicates, wherein the at least one SQL/XML statement is substantially equivalent in functionality to the SQL statement; and
   send the at least one SQL/XML statement to a database engine for execution.

* * * * *